US008108587B2

(12) United States Patent
Shirley et al.

(10) Patent No.: US 8,108,587 B2
(45) Date of Patent: Jan. 31, 2012

(54) FREE-SPACE REDUCTION IN CACHED DATABASE PAGES

(75) Inventors: Brett A. Shirley, Bellevue, WA (US); Laurion Burchall, Seattle, WA (US); Matthew Gossage, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 12/472,103

(22) Filed: May 26, 2009

(65) Prior Publication Data

US 2010/0306444 A1    Dec. 2, 2010

(51) Int. Cl.
*G06F 12/08* (2006.01)
*G06F 13/00* (2006.01)

(52) U.S. Cl. .............................. 711/3; 711/147; 711/129

(58) Field of Classification Search .............. 711/3, 129, 711/147
See application file for complete search history.

(56) References Cited

U.S. PATENT DOCUMENTS

| 5,566,315 | A | * | 10/1996 | Milillo et al. ................. 711/113 |
| 5,664,217 | A | * | 9/1997 | Cunningham et al. ............ 710/1 |
| 5,794,228 | A | | 8/1998 | French |
| 5,897,634 | A | * | 4/1999 | Attaluri et al. ........................ 1/1 |
| 7,412,465 | B2 | | 8/2008 | Hop Hing |
| 2003/0074256 | A1 | * | 4/2003 | LaCroix .......................... 705/14 |
| 2004/0193803 | A1 | * | 9/2004 | Mogi et al. ..................... 711/129 |
| 2008/0307188 | A1 | | 12/2008 | Franaszek |

OTHER PUBLICATIONS

Ailamaki et al., "A Storage Model to Bride the Processor/Memory Speed Gap," Submission to HPTS 2001, 5 pages.
Buggert et al., "Microsoft SQL Server 2008 Data and Backup Compression," Unisys, Aug. 19, 2008, 12 pages.
Favero, Willie, "The Big Deal about Making Things Smaller: DB2 Compression," z/Journal, Feb./Mar. 2008, 6 pages.
McAuliffe et al., "Towards Effective and Efficient Free Space Management," 12 pages, accessed on Mar. 24, 2009, accessed at: http://citeseerx.ist.psu.edu/viewdoc/download:jsessionid=DDF6E19858E64D3C56B50545DD747C-8C ?doi=10.1.1.50.6694&rep=rep1&type=pdf.
Rost et al., Asymptotically Optimal Multiversion B-Tree, Dec. 18, 2000, 7 pages.

* cited by examiner

Primary Examiner — Hoai V Ho
Assistant Examiner — Min Huang
(74) Attorney, Agent, or Firm — Merchant & Gould, P.C.

(57) ABSTRACT

A computing system stores a database comprising pages. Each of the pages is the same size. When a page is requested, a block of virtual memory addresses is associated with the page and a set of physical data storage locations is committed to the block of virtual memory addresses. A copy of the page is then stored into the set of physical data storage locations. Physical data storage locations committed to the virtual memory addresses associated with available free space in the copy of the page are deallocated, thereby allowing reuse of these physical data storage locations. A reference to the copy of the page is then returned.

20 Claims, 10 Drawing Sheets

FREE-SPACE REDUCTION IN CACHED DATABASE PAGES

BACKGROUND

Modern databases can include a very large number of database entries. Accordingly, it is important to use efficient techniques to identify the locations of desired database entries. Such techniques include the use of B+ trees. A B+ tree is a data structure comprising a set of data pages and one or more interior pages. Data pages are leaf nodes of the B+ tree and interior pages are non-leaf nodes of the B+ tree. The data pages contain the database entries of the database. The interior pages do not contain database entries, but rather contain information that enables a computing system to identify locations of desired database entries. For example, each of the interior pages contains a set of nodes. Each node in an interior page includes a key value and a reference. The key value specifies a value of a field of the database entries and the reference specifies another page in the B+ tree. The key values are ordered within an interior page in a predictable way. For example, if the key values are integers, the key values may be ordered within the interior page according to increasing numerical value.

When a computing system is attempting to identify the memory address of a desired database entry having a field specifying a particular value, the computing system identifies a node in an interior page having the highest-ordered key value that is less than or equal to the particular value. For example, if the particular value is 8 and the interior page has nodes having key values 3, 4, 7 and 9, the computing system identifies the node having the key value 7. After identifying the node, the computing system retrieves the page in the B+ tree indicated by the reference of the node. If the retrieved page is an interior page, the process repeats and the computing system retrieves another page in the B+ tree. If the retrieved page is a data page, the computing system identifies the desired database entry within the data page and returns the desired database entry.

Each of the pages have a fixed size. For example, each of the pages may have a size of 32 kilobytes (KB). In many instances, there are not enough nodes in the interior pages to completely fill the interior pages or not enough database entries in the data pages to completely fill the data pages. For example, an interior page may have a fixed size of 32 KB, but only contain 20 KB of data. In this example, the remaining 12 KB is unused free space.

SUMMARY

A computing system stores a database comprising pages. Each of the pages is the same size. When a page is requested, a block of virtual memory addresses is associated with the page and a set of physical data storage locations is committed to the block of virtual memory addresses. A copy of the page is then stored into the set of physical data storage locations. Physical data storage locations committed to the virtual memory addresses associated with available free space in the copy of the page are deallocated, thereby allowing reuse of these physical data storage locations. A reference to the copy of the page is then returned.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

As briefly described above, this disclosure describes automatic reduction of free-space in cached database pages. The techniques of this disclosure are described with reference to the attached figures. It should be appreciated that the attached figures are provided for purposes of explanation only and should not be understood as representing a sole way of implementing the techniques of this disclosure.

Figure 1:
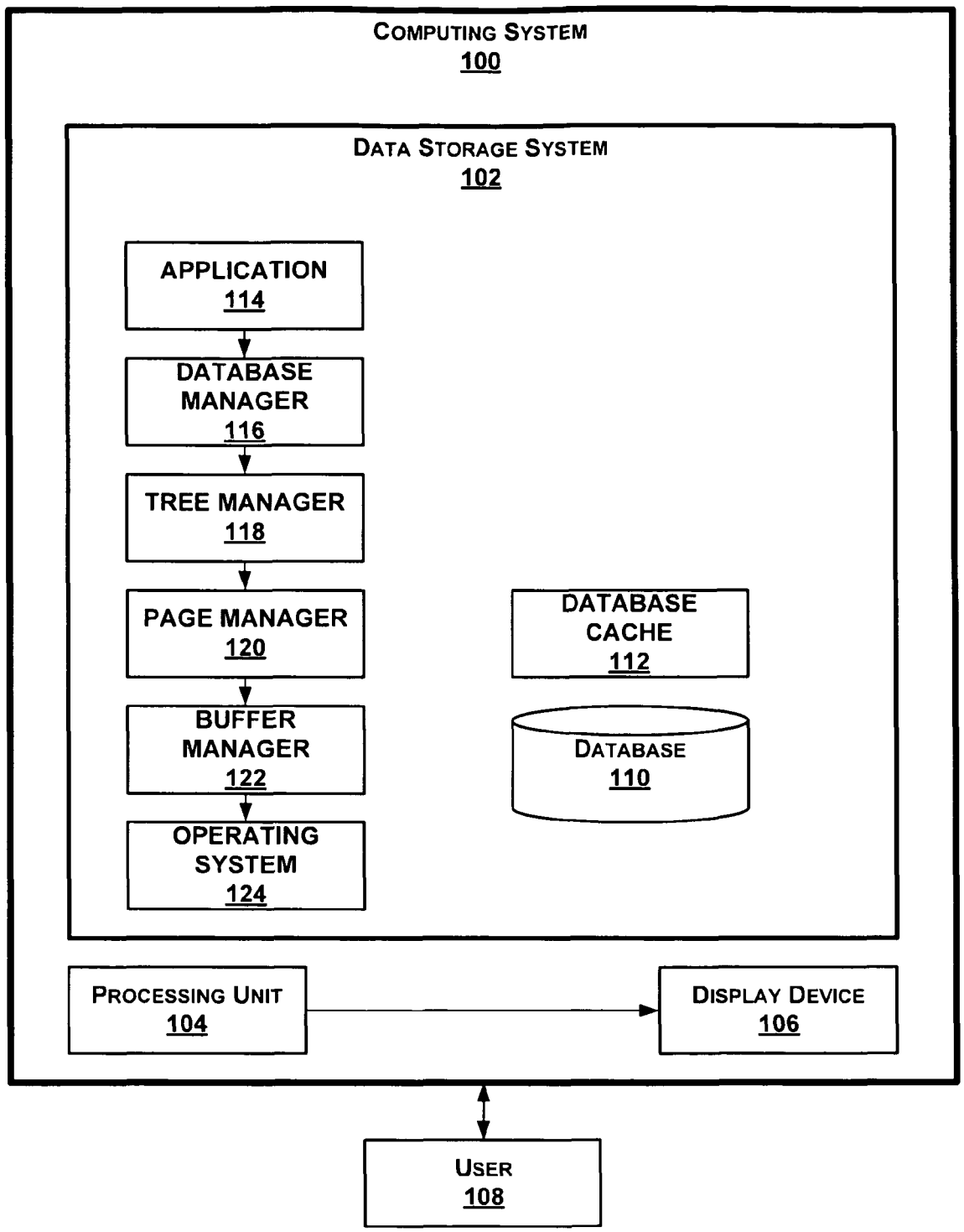
FIG. 1 is a block diagram illustrating an example computing system.

FIG. 1 is a block diagram illustrating an example computing system 100. The computing system 100 is an electronic computing system. As used in this disclosure, an electronic computing system is a set of one or more physical electronic computing devices. An electronic computing device is a physical machine that comprises physical electronic components. Electronic components are physical entities that affect electrons or fields of electrons in a desired manner consistent with the intended function of an electronic computing device. Example types of electronic components include capacitors, resistors, diodes, transistors, and other types of physical entities that affect electrons or fields of electrons in a manner consistent with the intended function of an electronic computing device. An example physical computing device is described below with reference to FIG. 11.

In the example of FIG. 1, the computing system 100 comprises a data storage system 102. The data storage system 102 is a data storage system. As used in this disclosure, a data storage system is a set of at least one physical computer readable data storage medium. A computer readable data storage medium is a physical article of manufacture that is capable of storing computer-readable data. Example types of computer readable data storage media include hard disk drives, flash memory units, random access memory (RAM) modules, read-only memory (ROM) modules, CD-ROM discs, Digital Versatile Disc (DVD) ROM discs, BluRay discs, magnetic tape, floppy disks, solid state drives, solid state memory, and other articles of manufacture that are capable of storing computer-readable data.

Furthermore, in the example of FIG. 1, the computing system 100 comprises a processing unit 104. The processing unit 104 is a processing unit. As used in this disclosure, a processing unit is a set of at least one physical integrated circuit that executes software instructions. As used in this disclosure, a software instruction is a data structure that represents an operation of a processing unit. For example, a software instruction may be a data structure comprising an operation code and zero or more operand specifiers. In this example, the operand specifiers may specify registers, memory addresses, or literal data. Execution of a software instruction by a processing unit of a computing system causes the computing system to perform the operation represented by the software instruction.

In the example of FIG. 1, the computing system 100 also comprises a display device 106. The display device 106 is a display device. As used in this disclosure, a display device is a physical machine that is capable of displaying images. Example types of display devices include computer monitors, televisions, liquid crystal display (LCD) screens, light-emitting diode (LED) screens, plasma screens, and other types of physical machines that are capable of displaying images.

A user 108, in the example of FIG. 1, interacts with the computing system 100. The user 108 is an individual human being. The user 108 may be using the computing system 100 on behalf of an enterprise. As used in this disclosure, an enterprise is a natural or legal entity. Example types of legal entities include corporations, partnerships, proprietorships, companies, non-profit corporations, foundations, estates, governmental agencies, and other types of legal entities. The user 108 may interact with the computing system 100 in a variety of ways. For example, the user 108 may use an input device, such as a keyboard or mouse, directly connected to the computing system 100 to interact with the computing system 100. In another example, the user 108 may interact with the computing system 100 by interacting with a client computing system (not shown) that communicates with the computing system 100.

In the example of FIG. 1, the data storage system 102 comprises a database 110. The database 110 is stored on one or more persistent computer-readable data storage media within the data storage system 102. As used in this disclosure, a persistent computer-readable data storage medium is a computer-readable data storage medium that does not lose data when power to the computer-readable data storage medium is suspended. In one example implementation, the processing unit 104 executes software instructions in the data storage system 102 that cause the computing system 100 to store the database 110 onto the persistent computer-readable data storage media. The database 110 may be stored on the persistent computer-readable data storage media in a variety of ways. For example, the database 110 may be stored on the persistent computer-readable data storage media as a file.

The database 110 comprises a set of pages. A page is a fixed-size block of data. Each of the pages in the database 110 has the same size. For example, each of the pages in the database 110 may be 32 kilobytes (KB). In another example, each of the pages in the database 110 may be 8 KB. In some implementations, the size of the pages in the database 110 is determined by an administrator of the database 110 when the database is created. Each of the pages in the database 110 includes substantive data. The substantive data is data having meaning. In some example implementations, the substantive data includes one or more nodes. Furthermore, in some implementations, the substantive data includes metadata. In other implementations, the substantive data does not include metadata.

Each page in the database 110 is either a data page or an interior page. Each of the data pages stores one or more database entries. For example, if a first database entry has a size of 12 KB, a second database entry has a size of 8 KB, and pages are 32 KB, a single data page is able to store the first database entry and the second database entry. In some implementations, when a database entry has a size greater than the size of the data pages, the database entry is divided among two or more data pages.

As used in this disclosure, a database entry is a data structure comprising a set of one or more fields. A field is a data structure that stores a value. A field may store a wide variety of different types of values. For example, a field may store an integer, a floating point number, a date, a binary large object (BLOB), a currency amount, a photograph, a string, or another type of value. As used in this disclosure, a first database entry and a second database entry belong to the same type of database entry when the first database entry and the second database entry have the same set of fields. In various implementations, the data entries may contain a wide variety of data. For example, data entries in the database 110 may be e-mail messages, calendar appointments, contact information, sales information, inventory information, project information, and so on.

Each of the nodes in a data page contains a database entry. For example, a data page may include five nodes, each storing a database entry. The metadata in a data page contains information about the data in the data page. In various implementations, the data pages may contain a variety of metadata. For example, data pages may contain headers, tag arrays, and other types of metadata. The total size of the database entries and the metadata in a data page may be less than the size of the data page. When the total size of the substantive data in a data page is less than the size of the data page, the data page contains free space. In another example, metadata in a data page contains information about how the data in the data page related to other data pages.

The interior pages in the database 110 do not contain database entries, but rather contain information that enables the computing system 100 to identify locations of desired data pages in the database 110. Each of the nodes in an interior page includes a key value and a reference. The key value specifies a value of a field of databases entries in a particular type of database entries. The reference indicates another interior page or data page. For example, each of the pages in the database 112 may have a unique identifier. In this example, a reference in a node specifies the unique identifier of a page. Key values in an interior page are ordered in a predictable way. For example, if the key values are integers, the key values may be ordered within the interior page according to increasing numerical value.

The pages in the database 110 are organized into one or more B+ trees. Data pages are leaf nodes of the B+ trees and interior pages are non-leaf nodes of the B+ trees. The interior pages are so named because they are not leaf nodes. In some implementations, the database 110 may contain separate B+ trees for each table in the database 110. For example, if the database 110 is implemented according to a relational model and the database 110 includes two tables, the database 110 may contain two B+ trees, one for each of the tables.

As described in detail below, when the computing system 100 is attempting to identify the virtual memory address of a desired database entry having a field specifying a particular value, the computing system 100 identifies a node in an interior page having the highest-order key value that is less than or equal to the particular value. For example, if the particular value is 8 and the interior page has nodes having key values 3, 4, 7 and 9, the computing system 100 identifies the node having the key value 7. After identifying the node, the computing system 100 retrieves the page in the B+ tree indicated by the reference of the node. If the retrieved page is an interior page, the process repeats and the computing system retrieves another page in the B+ tree. If the retrieved page is a data page, the computing system 100 identifies the desired database entry within the data page and returns the desired database entry.

In addition to the nodes, the interior pages include metadata. The metadata in an interior page contains information about the data in the interior page. In various implementations, the interior pages may contain a variety of metadata. For example, interior pages may contain headers, tag arrays, and other types of metadata. Such headers and tag arrays are described in detail below. The total size of the nodes and the metadata in an interior page may be less than the size of the interior page. When the total size of the nodes and the metadata in an interior page is less than the size of the interior page, the interior page contains free space.

The database 110 may be implemented according to a variety of database models. For example, the database 110 may be implemented according to an Indexed Sequential Access Method (ISAM) model, a relational model, a hierarchical model, an object model, a network model, or another type of database model. When the database 110 is implemented according to a relational model, the database 110 may be implemented using a variety of schemas. In one example, the database 110 may be implemented using a star schema or a snowflake schema of tables to create Online Analytical Processing (OLAP) data cubes. Furthermore, in some instances, when the database 110 is implemented according to a relational model, the database 110 comprises a set of tables. In such instances, some the database entries in the database 110 are rows of the tables and the fields of the database entries are columns of the tables.

In the example of FIG. 1, the data storage system 102 contains a database cache 112. The database cache 112 is a logical set of physical data storage locations in one or more computer-readable data storage media in the data storage system 102. As used in this disclosure, a physical data storage location is a physical device capable of storing data associated with an individual memory address. For example, a physical data storage location may be a circuit comprising a set of transistors capable of storing a byte of data. The computer-readable data storage media of the database cache 112 are capable of providing data to the processing unit 104 faster than the data can be provided from the database 110. For example, the database cache 112 may be stored in one or more RAM modules, whereas the database 110 may be stored in one or more hard disk drives. As described in detail below, the computing system 100 uses the database cache 112 to cache interior pages and data pages of the database 110 for quick access. Typically, the database cache 112 is smaller than the database 110. Consequently, not all of the database 110 can typically be stored in the database cache 112.

In the example of FIG. 1, the data storage system 102 also stores an operating system 124. The operating system 124 comprises a set of software instructions. For ease of explanation, this disclosure includes statements that describe the operating system 124 performing actions. Such statements should be understood to mean that when the software instructions of the operating system 124 are executed by the processing unit 104, the computing system 100 performs the actions.

The operating system 124 manages and coordinates activities and sharing of resources of the computing system 100. The operating system 124 provides a software interface that includes methods that can be invoked by applications. As discussed in detail below, some of the methods enable applications to reserve blocks of virtual memory addresses, allocate blocks of physical data storage locations to commit to blocks of virtual memory addresses, load data from persistent computer-readable data storage media into memory, write data in memory to persistent computer-readable data storage media, and so on.

In the example of FIG. 1, the data storage system 102 stores an application 114. The application 114 comprises a set of software instructions. For ease of explanation, this disclosure includes statements that describe the application 114 performing actions. Such statements should be understood to mean that when the software instructions of the application 114 are executed by the processing unit 104, the computing system 100 performs the actions.

The application 114 may provide a wide variety of functionalities. In a first example, the application 114 may provide a web service. In this first example, the application 114 may process web content requests received by the computing system 100. In a second example, the application 114 may provide a database access service. In this second example, the application 114 may be the Microsoft ACCESS® database software.

The data storage system 102 also stores a database manager 116. The database manager 116 comprises a set of software instructions. For ease of explanation, this disclosure includes statements that describe the database manager 116 performing actions. Such statements should be understood to mean that when the software instructions of the database manager 116 are executed by the processing unit 104, the computing system 100 performs the actions. The database manager 116 manages the database 110. Managing the database 110 entails enabling users and applications to retrieve data from the database 110 and to store data into the database 110 in a consistent way. To enable applications to retrieve data from the database 110 and to store data into the database 110, the database manager 116 provides a software interface that includes methods that can be invoked by the applications. Invoking the methods causes the database manager 116 to retrieve data from the database 110 or to store data into the database 110 in a consistent way. In the example of FIG. 1, the application 114 uses the software interface provided by the database manager 116 to store data into the database 110 and to retrieve data from the database 110.

In the example of FIG. 1, the data storage system 102 stores a tree manager 118. The tree manager 118 comprises a set of software instructions. For ease of explanation, this disclosure includes statements that describe the tree manager 118 performing actions. Such statements should be understood to mean that when the software instructions of the tree manager 118 are executed by the processing unit 104, the computing system 100 performs the actions.

The tree manager 118 manages the B+ trees in the database 110. Otherwise stated, the tree manager 118 maintains the B+ trees in the database 110, uses the B+ trees in the database 110 to store data into the database 110, and uses the B+ trees in the database 110 to retrieve data from the database 110. To enable the database manager 116 to store data into the database 110 and to retrieve data from the database 110, the tree manager 118 provides a software interface that includes methods that can be invoked by the database manager 116. Invoking the methods causes the tree manager 118 to use the B+ trees in the database 110 to retrieve database entries from the database 110 or to use the B+ trees in the database 110 to store data into the database 110. In the example of FIG. 1, the database manager 116 invokes the methods of the tree manager 118 to retrieve data from the database 110 and to store data into the database 110. Because the tree manager 118 manages the B+ trees in the database 110, the database manager 116 does not need to include software instructions regarding the B+ trees in the database 110.

In the example of FIG. 1, the data storage system 102 stores a page manager 120. The page manager 120 comprises a set of software instructions. For ease of explanation, this disclosure includes statements that describe the page manager 120 performing actions. Such statements should be understood to mean that when the software instructions of the page manager 120 are executed by the processing unit 104, the computing system 100 performs the actions.

The page manager 120 manages pages in the database 110. Managing the pages entails enabling other software modules to retrieve information about the pages, enabling other software modules to read data within the pages, enabling other software modules to write data to the pages, and otherwise manipulating pages. To enable other software modules to manipulate the pages, the page manager 120 provides a software interface that includes methods that can be invoked by the other software modules.

In the example of FIG. 1, the data storage system 102 stores a buffer manager 122. The buffer manager 122 comprises a set of software instructions. For ease of explanation, this disclosure includes statements that describe the buffer manager 122 performing actions. Such statements should be understood to mean that when the software instructions of the buffer manager 122 are executed by the processing unit 104, the computing system 100 performs the actions.

As described in detail below, the buffer manager 122 manages the database cache 112. The buffer manager 122 is so named because the database cache 112 acts as a buffer for read and write operations to the database 110. Managing the database cache 112 entails enabling software modules to read copies of pages of the database 110 into the database cache 112, enabling software modules to write data to copies of pages of the database 110 stored in the database cache 112, controlling the size of the database cache 112, and other activities related to manipulating the content of the database cache 112. To enable software modules to read data into the database cache 112 and to store data to copies of pages in the database cache 112, the buffer manager 122 provides a software interface that includes methods that can be invoked by the software modules. In the example of FIG. 1, the page manager 120 invokes methods of the software interface provided by the buffer manager 122 to retrieve and store pages into buffers in the database cache 112.

Furthermore, management of the database cache 112 entails removing copies of pages from the database cache 112. In other words, the database 112 evicts copies of pages from the database cache 112. For example, when the buffer manager 122 is reading a new copy of a page in the database 110 into the database cache 112 when the database cache 112 is full, the buffer manager 122 selects one or more copies of pages already in the database cache 112 for removal. If a selected copy of a page is dirty, the buffer manager 122 writes the selected dirty copy of the page back to the database and frees the virtual memory addresses associated with the selected dirty copy of the page. Freeing the virtual memory addresses associated with the selected dirty copy of the page allows the virtual memory addresses to be re-used. For instance, the virtual memory address may be re-used by the buffer manager 122 or another software module. The buffer manager 122 also deallocates the physical data storage locations in the database cache 112 associated with the virtual memory addresses associated with the selected dirty copy of the page. Deallocating the available the physical data storage locations allows the operating system 124 to use the physical data storage locations to store other data. In this disclosure, the terms deallocating and decommitting are interchangeable. As used in this disclosure, a copy of a page is dirty if the copy of the page in the database cache 112 contains data different than the page itself in the database 110. If a selected copy of a page is not dirty (i.e. it is 'clean'), the buffer manager 122 frees the virtual memory addresses associated with the selected copy of the page and deallocates the physical data storage locations associated with the virtual memory addresses of the page, but does not write the selected copy of the page back to the database 110.

In various implementations, the buffer manager 122 may use a variety of different schemes to select copies of pages in the database cache 112 for removal. For example, the buffer manager 122 may use a least-recently used scheme to select the copies of the pages in the database cache 112 for removal.

As described in detail below, when the application 114 needs to read one or more database entries in the database 110, the application 114 generates a request for the database entries. In one example implementation, the application 114 generates the request for the database entries by invoking a method of the database manager 116, specifying one or more criteria that identify the database entry. For example, when the application 114 invokes the method of the database manager 116, the application 114 may provide a query to the database manager 116. In this example, the query may be formatted in a variety of ways. For example, the query may be formatted using Structured Query Language (SQL), Lightweight Directory Access Protocol (LDAP), Multidimensional Expressions (MDX), cursor-based navigation by primary indexes or secondary indexes, or otherwise. The application 114 may need to read one or more database entries in the database 110 for a wide variety of reasons. For example, the application 114 may need to read one or more database entries in the database 110 to process a web content request.

In some example implementations, when the database manager 116 receives the invocation of the method, the database manager 116 processes the criteria to identify a requested value of a field or key of a type of data entry in the database 110. For example, the database manager 116 may process the criteria to identify the value "Henry" as the requested value of a "Names" field of "Employee" database entries in the database 110. After the database manager 116 identifies the requested value of the field, the database manager 116 invokes a method of the tree manager 118 to retrieve data entries in the database 110 having the requested value of the field.

As described below with reference to FIG. 5, when the tree manager 118 receives the invocation of the method to identify database entries having fields that specify the requested value, the tree manager 118 uses a B+ tree in the database 110 to identify the database entries. When the tree manager 118 uses the B+ tree to identify the database entries, the tree manager 118 invokes a read method of the page manager 120 to retrieve pages in the database 110.

When the page manager 120 receives the invocation of the read method that specifies the requested page, the page manager 120 invokes a read method of the buffer manager 122 to obtain a reference indicating a virtual memory address in the database cache 112 associated with a copy of the requested page. In response to receiving the invocation of the read method, the buffer manager 122 determines whether the database cache 112 stores a copy of the requested page. If the database cache 112 stores a copy of the page, the page manager 120 provides a reference indicating a virtual memory address in the database cache 112 associated with the copy of the requested page. If the database cache 112 does not store a copy of the requested page, the buffer manager 122 invokes methods of the operating system 124 to reserve an initial block of virtual memory addresses in the database cache 112. The buffer manager 122 also invokes one or more methods of the operating system 124 to allocate a set of physical data storage locations committed to the initial block of virtual memory addresses. The buffer manager 122 then invokes a method of the operating system 124 to load a copy of the requested page into the set of physical data storage locations. Because the set of physical data storage locations is committed to the block of virtual memory addresses, applications can use virtual memory addresses in the block of virtual memory addresses to retrieve data from and store data to the set of physical data storage locations.

As discussed above, pages may contain free space. After a copy of a page is stored into the database cache 112, the buffer manager 122 deallocates the physical data storage locations committed to the virtual memory addresses associated with available free space in the copy of the page. Consequently, the operating system 124 is able to reallocate the physical data storage locations in the database cache 112 previously committed to the virtual memory addresses associated with the consolidated block of free space. This may enable the database cache 112 to store more pages of the database 110. Storing more pages of the database 110 in the database cache 112 may result in faster response times when servicing requests to read data from or write data to the database 110.

The application 114, the database manager 116, the tree manager 118, the page manager 120, and the buffer manager 122 may perform a similar operation when the application 114 needs to write data to a database entry in the database 110.

Figure 2:
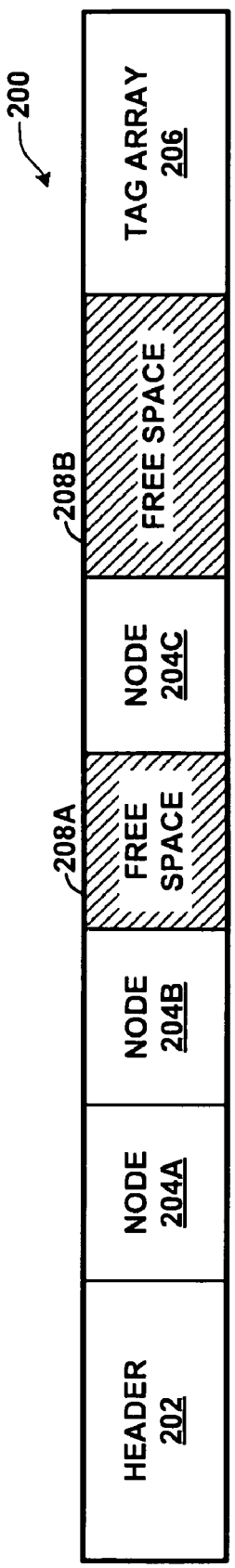
FIG. 2 is a diagram of an interior page before reorganization.

FIG. 2 is a diagram of an interior page 200 before reorganization. It should be appreciated that FIG. 2 is provided for purposes of explanation only. FIG. 2 is not intended to represent a sole way of implementing an interior page before free space reduction.

As shown in the example of FIG. 2, the interior page 200 comprises a header 202, a node 204A, a node 204B, a node 204C, a tag array 206, a first block of free space 208A and a second block of free space 208B. This disclosure refers to the node 204A, the node 204B, and the node 204C collectively as "the nodes 204." Furthermore, this disclosure refers to the first block of free space 208A and the second block of free space 208B collectively as "the free space 208." In the example of FIG. 2, the header 202 and the tag array 206 are metadata.

The header 202 is a data structure containing information about the interior page 200. For example, the header 202 may contain a value indicating that the interior page 200 is an interior page as opposed to a data page. In an additional example, the header 202 may contain an available free space value indicating the size of the free space 208 in the interior page 200. In a third example, the header 202 contains a value indicating the size of the last contiguous block of available free space before the tag array 206 in the interior page 200. The header 202 is stored at the beginning of the interior page 200.

Each of the nodes 204 comprises a key value and a reference to another page in the database 110. As discussed briefly above, the key values in the nodes 204 are arranged in a predicable order. For example, if the key values are text strings, the key values in the nodes 204 may be arranged in alphabetical order. In another example, if the key values are dates, the key values in the nodes 204 may be arranged in chronological order. In a third example, if the key values are numbers, the key values in the nodes 204 may be arranged in increasing numerical order. There may be blocks of free space located between individual ones of the nodes 204. In the example of FIG. 2, the first block of free space 208A is located between the node 204B and the node 204C. It should be appreciated that other interior pages may have more or fewer nodes than the three shown in the example of FIG. 2.

The tag array 206 comprises offset values indicating virtual memory addresses of the nodes 204 relative to an initial virtual memory address of the interior page 200. For example, the tag array 206 may comprise a first offset value indicating that the node 204A starts at a virtual memory address 32 bytes after the initial virtual memory address of the interior page 200, a second offset value indicating that the node 204B starts at a virtual memory address 128 bytes after the initial virtual memory address of the interior page 200, and a third offset value indicating that the node 204C starts at a virtual memory address 365 bytes after the initial virtual memory address of the interior page 200. In the example of FIG. 2, the offset values in the tag array 206 are necessitated by the fact that the nodes 204 may not all be the same size and by the fact that there may be free space between individual ones of the nodes 204.

In some example implementations, data pages in the database 110 are structured in a manner similar to interior page 200. For instance, data pages may have headers equivalent to header 202 and may have tag arrays equivalent to tag array 206. However, the nodes in data pages contain database entries instead of references to other pages. In some implementations, the nodes in data pages contain keys. The keys in the nodes of data pages facilitate sorting of the database entries in the nodes. In such example instances, the offset values in the tag array of a database entry indicate virtual memory addresses of the database entries relative to an initial virtual memory address of the data page.

Figure 3:
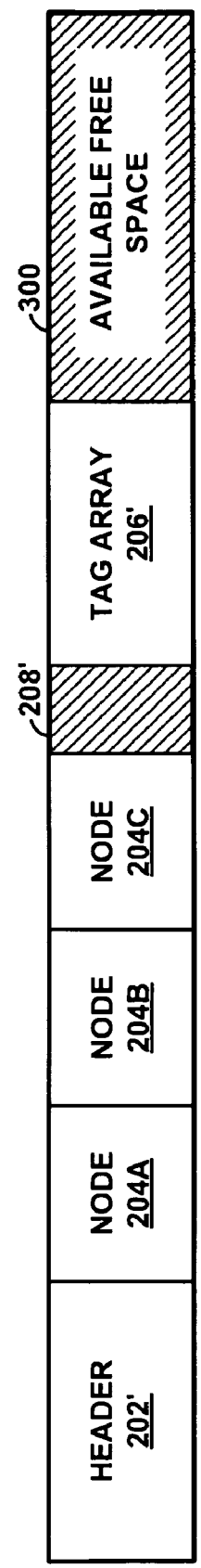
FIG. 3 is a diagram of an interior page after reorganization.

FIG. 3 is a diagram of an interior page 200 after reorganization. It should be appreciated that FIG. 3 is provided for purposes of explanation only. FIG. 3 is not intended to represent a sole way of implementing an interior page after reorganization.

The interior page 200 illustrated in the example of FIG. 3 is the result of reorganizing the interior page 200 illustrated in the example of FIG. 2. As illustrated in the example of FIG. 3, the interior page 200 includes a header 202', the node 204A, the node 204B, the node 204C, and a tag array 206'. Furthermore, the interior page 200 includes a block of unavailable free space 208'.

As it can be seen in the example of FIG. 3, after the page manager 120 reorganizes of the interior page 200, the nodes 204 have been reorganized within the interior page 200 such that free space adjacent to one or more of the nodes 204 is reduced. As illustrated in the example of FIG. 3, the free space adjacent to the nodes 204 is reduced such that the header 202', the nodes 204, the block of unavailable free space 208', and the tag array 206' are associated with a first contiguous block of virtual memory addresses within the interior page 200. Furthermore, after the page manager 120 reorganizes the interior page 200, the interior page 200 contains a block of available free space 300 associated with a second contiguous block of virtual memory addresses within the interior page 200. The header 202', the nodes 204, the block of unavailable free space 208' and the tag array 206' are associated with contiguous virtual memory addresses at first end of the virtual memory addresses associated with the interior page 200. The block of available free space 300 is associated with virtual memory addresses at an opposite end of the virtual memory addresses associated with the interior page 200.

The block of unavailable free space 208' exists in the interior page 200 because operating systems typically do not allow applications to reserve blocks of virtual memory addresses smaller than a minimum commit size. In other words, the minimum commit size is the minimum number of bytes that the operating system 124 is configured to allocate. For example, the operating system 124 may address physical data storage locations at a per-byte level, but the operating system 124 may not allow applications to reserve blocks of virtual memory addresses smaller than 4 KB. As a result, when the total size of the header 202', the nodes 204, and the tag array 206' is not a multiple of the minimum commit size, a block of unavailable free space 208' is associated with a sufficient number of virtual memory addresses to ensure that the total size of substantive data (i.e., the header 202', the nodes 204, and the tag array 206' plus the block of unavailable free space 208' is a multiple of the minimum commit size. Because the block of unavailable free space 208' is not available to be removed from the interior page 200, this disclosure refers to the block of unavailable free space 208' as unavailable free space. In contrast, free space in addition to the block of unavailable free space 208' is available to be removed. Consequently, this disclosure refers to free space that is available to be removed as available free space. The size of the available free space is equal to the size of the requested page minus a smallest multiple of the minimum commit size that is greater than a size of the substantive data.

In some example implementations, after reorganization, the header 202' differs from the header 202 in the interior page 200 in that the header 202' indicates the size of the block of unavailable free space 208' as opposed to the block of unavailable free space 208' and the block of available free space 300 in the interior page 200. The tag array 206' differs from the tag array 206 in that the tag array 206' comprises different offset values to indicate the new virtual memory addresses of the nodes 204 relative to an initial virtual memory address of the interior page 200.

As mentioned above, data pages may, in some example implementations, have a similar structure to the interior page 200. In such example implementations, data page may be reorganized in a manner similar to the reorganization of the interior page 200 illustrated in the example of FIG. 3.

Figure 4:
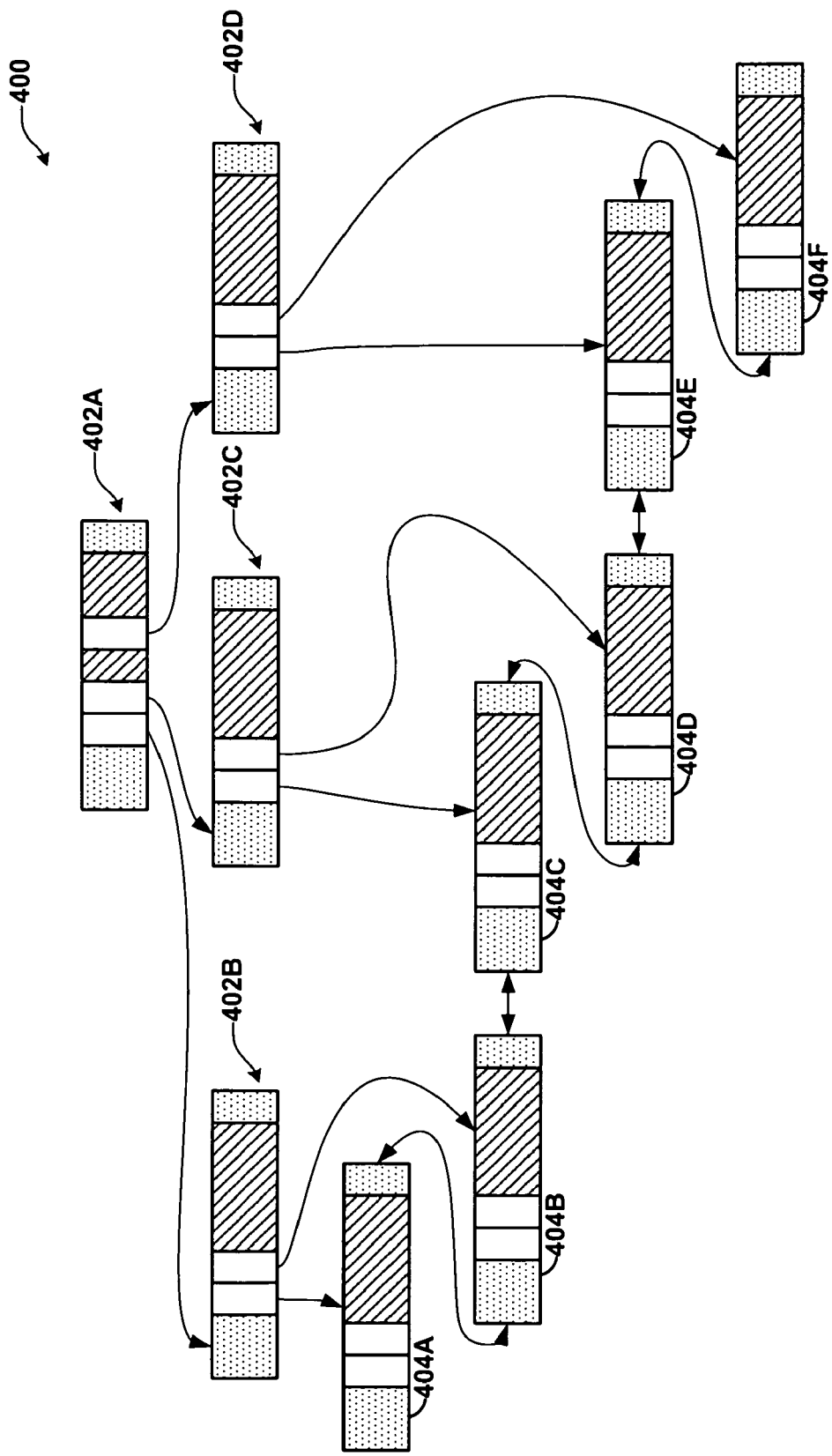
FIG. 4 is a diagram of a B+ tree before free-space reduction of pages.

FIG. 4 is a diagram of a B+ tree 400 before free space reduction of pages. It should be appreciated that FIG. 4 is provided for purposes of explanation only. FIG. 4 is not intended to represent a sole way of implementing a B+ tree before free space reduction.

As illustrated in the example of FIG. 4, the B+ tree 400 comprises an interior page 402A, an interior page 402B, an interior page 402C, and an interior page 402D. This disclosure refers to the interior page 402A, the interior page 402B, the interior page 402C, and the interior page 402D collectively as "the interior pages 402." The B+ tree 400 also comprises a data page 404A, a data page 404B, a data page 404C, a data page 404D, a data page 404E, and a data page 404F. This disclosure refers to the data page 404A, the data page 404B, the data page 404C, the data page 404D, the data page 404E, and the data page 404F collectively as "the data pages 404."

In the example of FIG. 4, nodes are illustrated as white blocks within the interior pages 402, free space is illustrated as diagonally lined blocks within the interior pages 402, and metadata are illustrated as dotted blocks within the interior pages 402. Furthermore, in the example of FIG. 4, database entries are illustrated as white blocks within the data pages 404, free space is illustrated as diagonally lined blocks within the data pages 404, and metadata are illustrated as dotted blocks within the data pages 404. As illustrated in the example of FIG. 4, arrows extend from each of the nodes in the interior pages 402 to other ones of the interior pages 402 or to ones of the data pages 404. An arrow extending from a node to a page indicates that the node contains a reference to the page. In the example of FIG. 4, no nodes contain references to the interior page 402A. As used in this disclosure, when no node contains a reference to an interior page in a B+ tree, the interior page is the root interior page of the B+ tree.

In the example of FIG. 4, arrows extend from each of the data pages 404 to at least one other one of the data pages 404. An arrow from a first one of the data pages 404 to a second one of the data pages 404 indicates that the first one of the data pages 404 contains a reference to the second one of the data pages 404. The reference from the first one of the data pages 404 to the second one of the data pages 404 may enable sequential access of the data pages 404. In the example of FIG. 4, the arrows are double headed. A double-headed arrow between a first one of the data pages 404 and a second one of the data pages 404 implies that the first one of the data pages 404 contains a reference to the second one of the data pages 404 and the second one of the data pages 404 contains a reference to the first one of the data pages 404.

Figure 5:
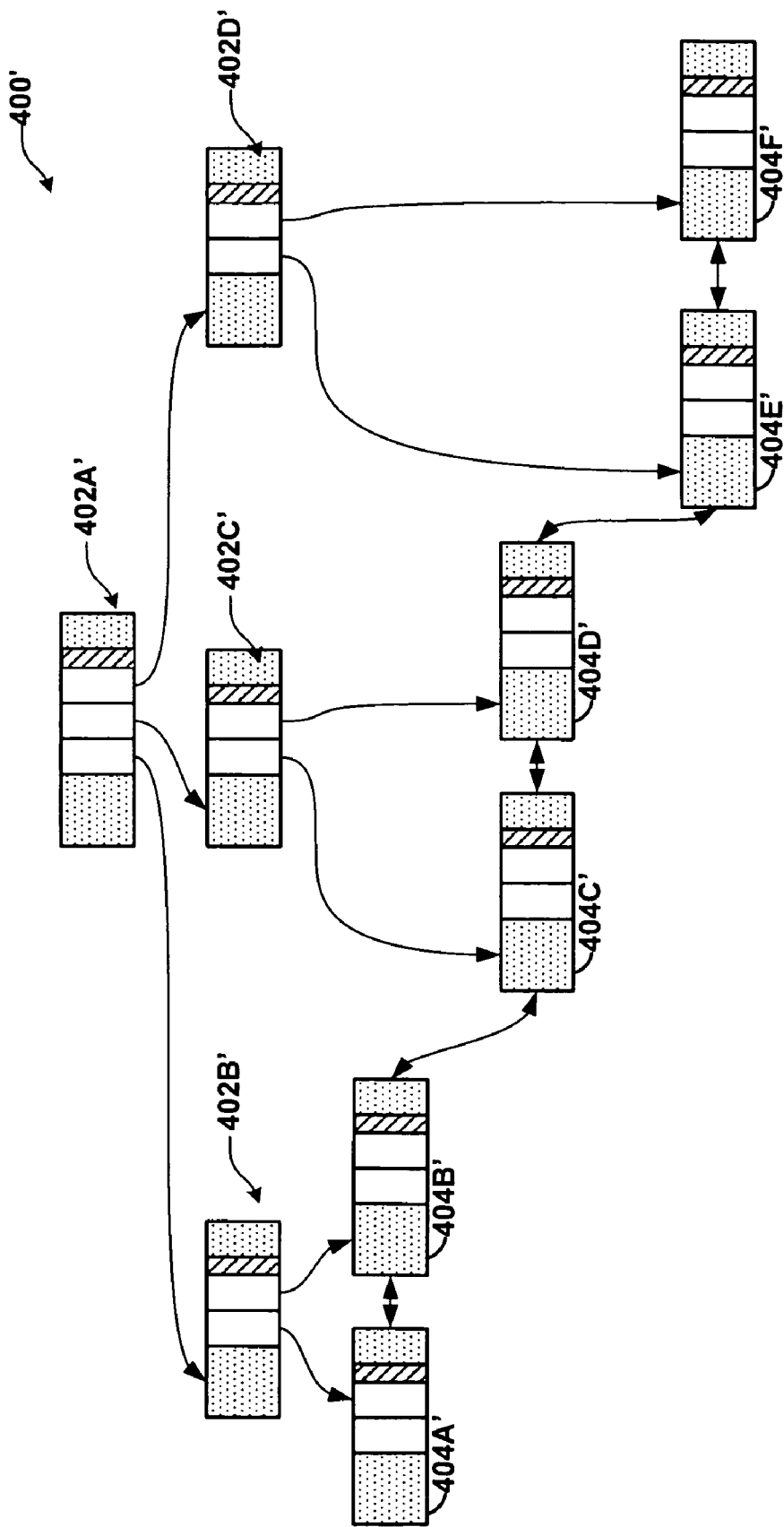
FIG. 5 is a diagram of the B+ tree after free-space reduction of the pages.

FIG. 5 is a diagram of a B+ tree 400' after free space reduction. It should be appreciated that FIG. 5 is provided for purposes of explanation only. FIG. 5 is not intended to represent a sole way of implementing a B+ tree after free space reduction.

The B+ tree 400' is the result of reorganizing the interior pages 402 and reducing free space on the interior pages 402 illustrated in the example of FIG. 4. As illustrated in the example of FIG. 5, the B+ tree 400' largely has the same structure as the B+ tree 400 illustrated in the example of FIG. 4. However, in the B+ tree 400', an interior page 402A' replaces the interior page 402A, an interior page 402B' replaces the interior page 402B, an interior page 402C' replaces the interior page 402C, and an interior page 402D' replaces the interior page 402D. This disclosure refers to the interior page 402A', the interior page 402B', the interior page 402C', and the interior page 402D' collectively as the interior pages 402'. Furthermore, in the B+ tree 400', a data page 404A' replaces the data page 404A, a data page 404B' replaces the data page 404B, a data page 404C' replaces the data page 404C, a data page 404D' replaces the data page 404D, a data page 404E' replaces the data page 404E, and a data page 404F' replaces a data page 404F. The data pages 404' are reorganized versions of the data pages 404.

Figure 6:
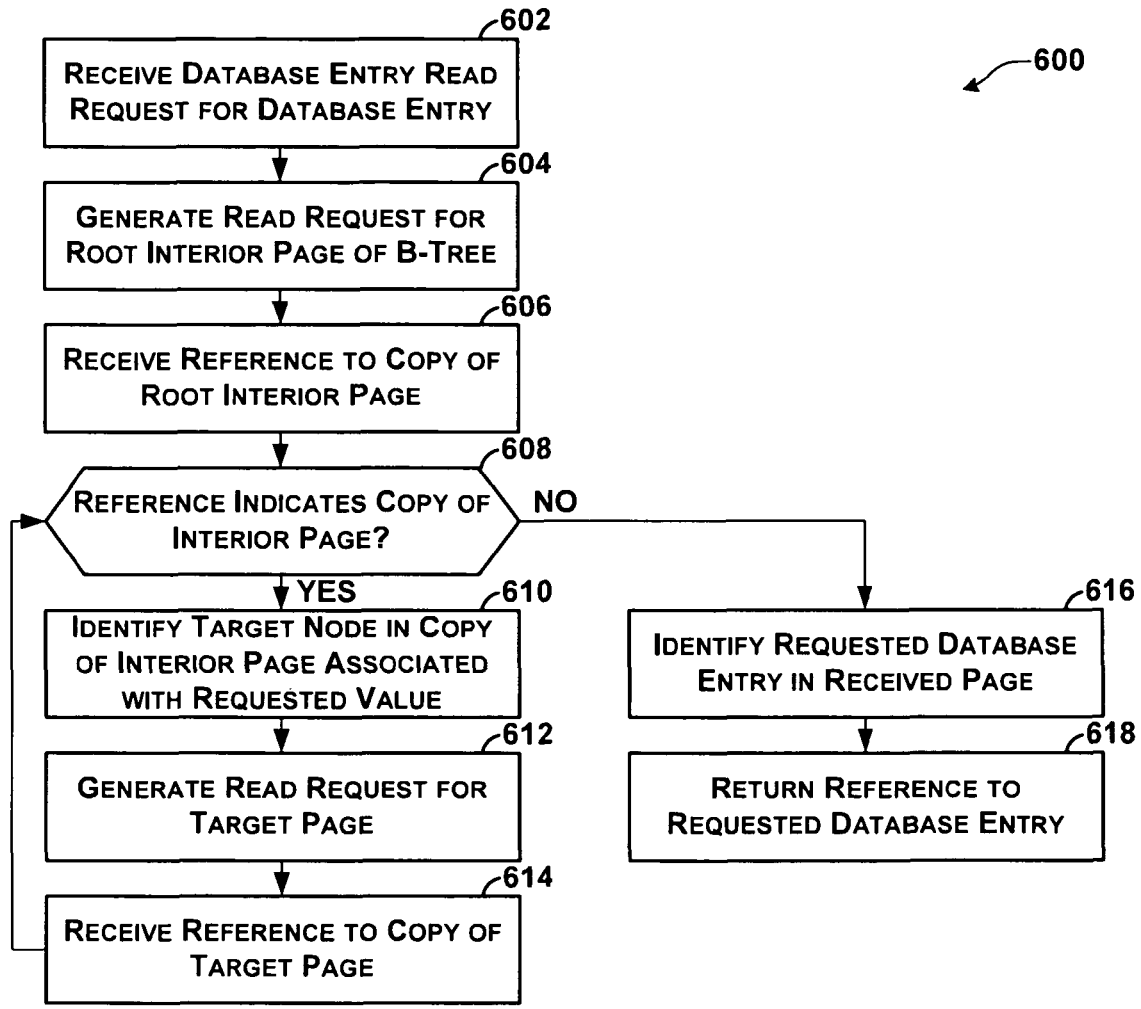
FIG. 6 is a flowchart illustrating an example operation of a tree manager in response to a database entry read request.

FIG. 6 is a flowchart illustrating an example operation 600 of the tree manager 118 in response to receiving a database entry read request for a database entry. It should be appreciated that FIG. 6 is provided for purposes of explanation only. FIG. 6 is not intended to represent a sole possible operation of the tree manager 118 in response to a read request for a database entry. For example, other operations of the tree manager 118 may include more or fewer steps. In another example, other operations of the tree manager 118 may include the steps of the operation 600 in a different order. Moreover, it is to be understood that other software or hardware components within the computing system 100 may perform the steps of the operation 600.

As illustrated in the example of FIG. 6, the operation 600 starts when the tree manager 118 receives a database entry read request for a requested database entry (602). As described above with regard to one example implementation, the tree manager 118 may receive the read request when the database manager 116 invokes a method of a software interface provided by the tree manager 118. The database entry read request specifies a requested value of a field of database items in the database 110. For example, the database entry read request may specify the value "20."

After receiving the database entry read request, the tree manager 118 generates a page read request for a root interior page of a B+ tree in the database 110 (604). In one example implementation, the tree manager 118 generates the page read request for the root interior page of the B+ tree by invoking a method in a software interface provided by the page manager 120. After the tree manager 118 has generated the page read request, the tree manager 118 receives in response to the page read request a reference indicating a virtual memory address associated with copy of the root interior page of the B+ tree (606). The copy of the root interior page is stored in the database cache 112. In one example implementation, the reference to the copy of the root interior page indicates a first virtual memory address associated with the copy of the root interior page in the database cache 112.

Next, the tree manager 118 determines whether the reference indicates a virtual memory address associated with a copy of an interior page or a copy of a data page (608). In one example implementation, the tree manager 118 determines whether the reference returned by the page manager 120 indicates a copy of an interior page or a copy of a data page by examining a header portion of the page referred to by the reference.

If the tree manager 118 determines that the reference returned by the page manager 120 indicates a virtual memory address associated with a copy of an interior page ("YES" of 608), the tree manager 118 identifies a target node in the copy of the interior page associated with the requested value (610). As used in this disclosure, a node is associated with the requested value when the node has, among the nodes in the copy of the interior page, the highest-ordered key value that is less than or equal to the requested value.

The tree manager 118 then generates a page read request for a target page indicated by the target node (612). In one example implementation, the tree manager 118 generates the page read request for the target page indicated by the target node by invoking a method in a software interface provided by the page manager 120. Next, the tree manager 118 receives a reference in response to the page read request (614). The reference indicates a virtual memory address associated with a copy of the target page indicated by the target node. The tree manager 118 then loops back and again determines whether the reference returned in response to the most recent page read request indicates a copy of an interior page or a copy of a data page (608).

If the tree manager 118 determines that the reference does not indicate a virtual memory address of a copy of an interior page (i.e., a copy of a data page) ("NO" of 608), the tree manager 118 identifies a database entry having the request value within the copy of the data page (616). The tree manager 118 then returns a reference to the identified database entry as a response to the database entry read request (618).

Figure 7:
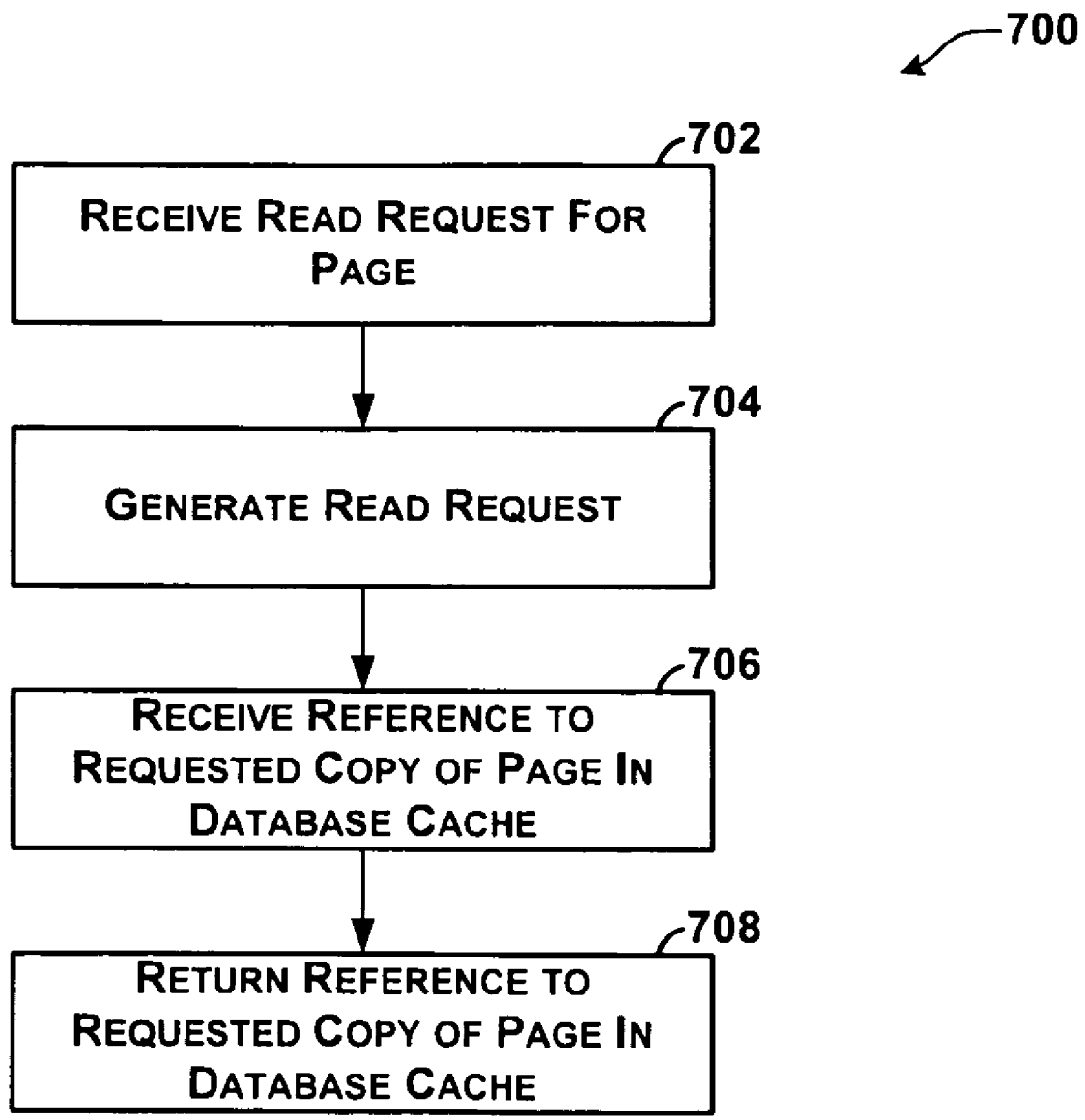
FIG. 7 is a flowchart illustrating an example operation of a page manager in response to a read request.

FIG. 7 is a flowchart illustrating an example operation 700 of the page manager 120 in response to receiving a read request for a page. It should be appreciated that FIG. 7 is provided for purposes of explanation only. FIG. 7 is not intended to represent a sole possible operation of the page manager 120 in response to a read request for a page. For example, other operations of the page manager 120 may include more or fewer steps. In another example, other operations of the page manager 120 may include the steps of the operation 700 in a different order. Moreover, it is to be understood that other software or hardware components within the computing system 100 may perform the steps of the operation 700.

As illustrated in the example of FIG. 7, the operation 700 starts when the page manager 120 receives a page read request for a requested page (702). In one example implementation, the page manager 120 receives the page read request when the page manager 120 receives an invocation of a method of a software interface provided by the page manager 120. Upon receiving the page read request, the page manager 120 generates a read request (704). The read request indicates the requested page. In one example implementation, the page manager 120 generates the read request by invoking a method of the buffer manager 122. The read request causes the requested page to be copied from the database 110 to the database cache 112. In response to the read request, the page manager 120 receives a reference to a first virtual memory address of a copy of the requested page in the database cache 112 (706). The page manager 120 then returns the reference to the first virtual memory address of the copy of the requested page in the database cache 112 as a response to the page read request for the page (708).

Figure 8:
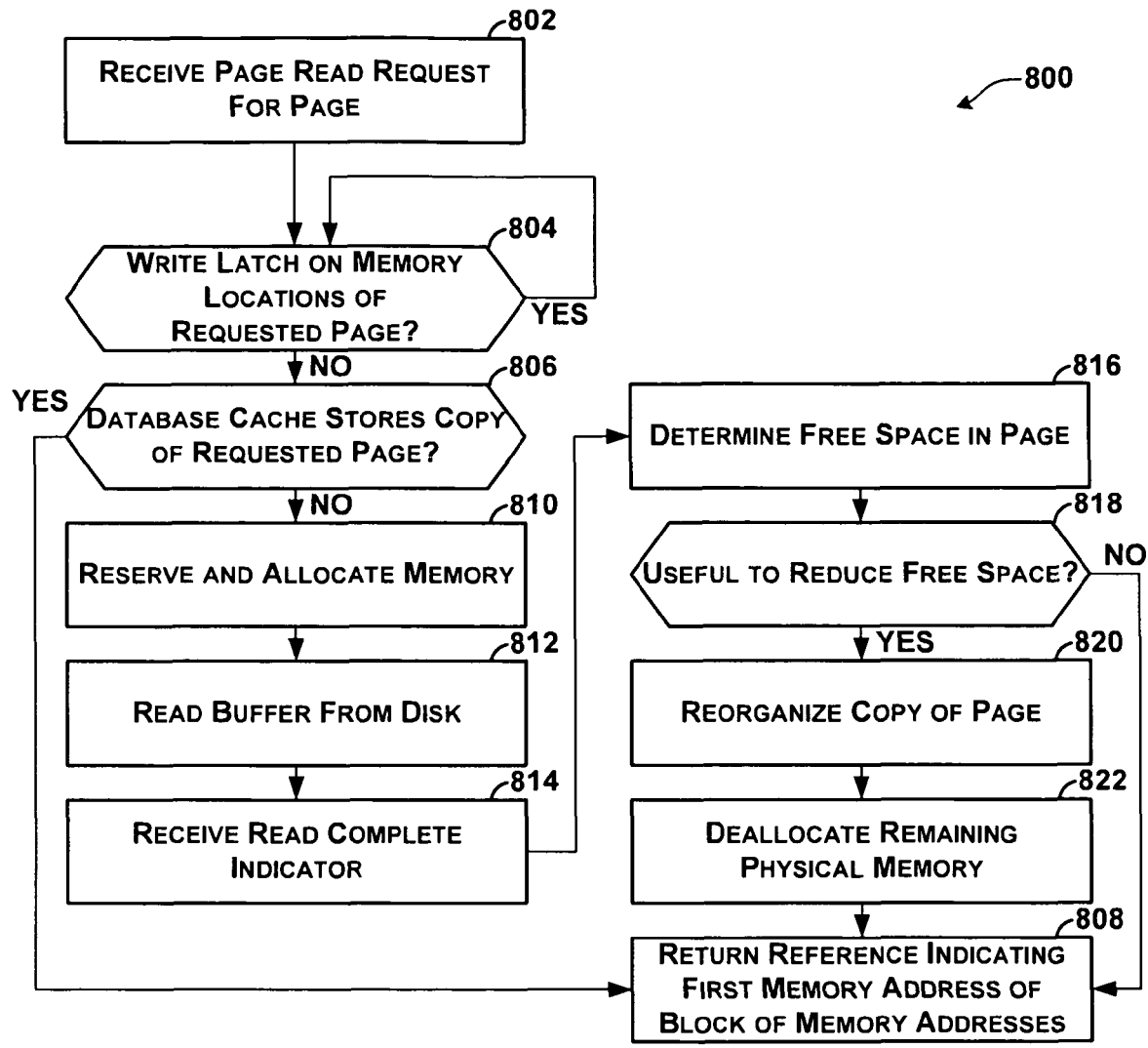
FIG. 8 is a flowchart illustrating an example operation of a buffer manager in response to a read request.

FIG. 8 is a flowchart illustrating an example operation 800 of the buffer manager 122 in response to receiving a page read request. It should be appreciated that FIG. 8 is provided for purposes of explanation only. FIG. 8 is not intended to represent a sole possible operation of the buffer manager 122 in response to a page read request for a page. For example, other operations of the buffer manager 122 may include more or fewer steps. In another example, other operations of the buffer manager 122 may include the steps of the operation 800 in a different order. Moreover, it is to be understood that other software or hardware components within the computing system 100 may perform the steps of the operation 800.

In the example of FIG. 8, the operation 800 begins when the buffer manager 122 receives a page read request for a requested page (802). In one example implementation, the buffer manager 122 receives the page read request when the page manager 120 invokes a method of a software interface provided by the buffer manager 122. The page read request specifies the requested page.

In response to receiving the page read request, the buffer manager 122 determines whether there is a write latch on a buffer in the database cache 112 (804). The buffer is the set of the virtual memory addresses associated with the requested page. A write latch is a software construct for ensuring mutual exclusion. That is, a write latch on a buffer ensures that no process can read from any of the virtual memory address in the buffer while another process is writing to any of the virtual memory addresses in the buffer. If there is a write latch on any of the virtual memory addresses in the requested page ("YES" of 804), the buffer manager 122 waits until there is no write latch on the requested page (804). In this way, the buffer manager 112 implements a read latch on the buffer.

When there is no write latch on the requested page ("NO" of 804), the buffer manager 122 determines whether the database cache 112 stores a copy of the requested page in the database cache 112 (806). In one example implementation, the buffer manager 122 determines whether the database cache 112 stores a copy of the requested page by determining whether a hash table contains an entry for a page number of the requested page. If the database cache 112 stores a copy of the requested page ("YES" of 806), the buffer manager 122 returns a reference indicating a first virtual memory address in a block of virtual memory addresses associated with the copy of the requested page (808).

On the other hand, if the database cache 112 does not store a copy of the requested page ("NO" of 806), the buffer manager 122 reserves an initial block of virtual memory addresses for the requested page and allocates a set of physical data storage locations to store data associated with the initial block of virtual memory addresses (810). In one example implementation, when the operating system 124 launches a process, the operating system 124 provides the process with a virtual address space. The operating system 124 then maps the process's executable file to virtual memory addresses in the process's virtual address space and maps virtual memory addresses of shared libraries to virtual memory addresses in the process's virtual address space. In the example of FIG. 1, the application 114 is a process and virtual memory addresses of the database manager 116, the tree manager 118, the page manager 120, the buffer manager 122, and the operating system 124 are mapped to virtual memory addresses in the virtual address space of application 114. When the process executes, the process exclusively refers to virtual memory addresses in the process's virtual address space. For instance, the program counter of the process indicates a virtual memory address in the process's virtual address space. The operating system 124 is responsible for maintaining a mapping between virtual memory addresses in the process's virtual address space and addresses of the physical data storage locations of the computing system 100.

In some implementations, the buffer manager 122 reserves an initial block of virtual memory addresses for the requested page and allocates a set of physical data storage locations to store data associated with the initial block of virtual memory addresses by invoking one or more methods provided by the operating system 124. When the operating system 124 receives a request from the database cache 112 to reserve a block of virtual memory addresses, the operating system 124 reserves a block of virtual memory addresses in the virtual address space of the application 114. Reserving the block of virtual memory addresses ensures that the operating system 124 does not provide virtual memory addresses in the block of virtual memory addresses in response to a subsequent request to reserve virtual memory addresses. However, when the operating system 124 receives the request to reserve a block of virtual memory addresses, the operating system 124 does not necessarily commit physical data storage locations to store data associated with the block of virtual memory addresses. When the operating system 124 receives a request to allocate a set of physical data storage locations, the operating system 124 commits physical data storage locations in the database cache 112 to physically store data. In some implementations, the buffer manager 122 is able to reserve virtual memory addresses and allocate physical data storage locations in a single method call to the operating system 124.

In other implementations, the buffer manager 112 maintains a pool of unused virtual memory addresses. Each virtual memory address in the pool is reserved for use by the buffer manager 112, but is not currently associated with any meaningful data. In such implementations, the buffer manager 112 reserves the initial block of virtual memory addresses for the requested page by removing the initial block of virtual memory addresses from the pool of unused virtual memory addresses. In this way, the buffer manager 112 reserves the initial block of virtual memory addresses without invoking a function of the operating system 124. In such implementations, the buffer manager 112 may still invoke functions of the operating system 124 to allocate a set of physical storage locations to store data associated with the initial block of virtual memory addresses, if the virtual memory addresses are not already associated with a set of physical storage locations.

After reserving the initial block of virtual memory addresses for the requested page and allocating the set of physical data storage locations, the buffer manager 122 generates a read request to read a copy of the requested buffer from the database 110 into the set of physical data storage locations (812). To generate the read request, the buffer manager 122 invokes a read method of the operating system 124. In one example implementation, the requested page is identified by a page number. For instance, the requested page may be identified by the page number 82. In this example implementation, when the buffer manager 122 generates the read request, the buffer manager 122 multiplies the page number of the requested page by the size of the pages in the database 110. The buffer manager 122, in this example implementation, then sets a file pointer of a file containing the database 110 to the resulting number. In this example implementation, the buffer manager 122 instructs the operating system 124 to read from a persistent computer-readable data storage medium a block of data having the size of the pages, starting at the file pointer of the file containing the database 110. For instance, if the pages in the database 110 are 32 KB, the buffer manager 122 instructs the operating system 124 to read 32 KB, starting at the file pointer of the file containing the database 110. In some implementations, the buffer manager 122 uses direct offset-based file Application Programming Interfaces (APIs) for reading data from the database 110. The direct offset-based file API do not require a file pointer.

When a copy of the requested buffer has been read into the set of physical data storage locations, the buffer manager 122 receives a read complete indicator (814). For instance, if the buffer manager 122 generates the read request by invoking a read method of the operating system 124, the buffer manager 122 may receive the read complete indicator from the operating system 124.

The buffer manager 122 then determines a size of the free space in the interior page (816). In one example implementation, the buffer manager 122 determines the size of the free space in the copy of the requested page by invoking a method of the page manager 120, specifying the first virtual memory address in the initial block of virtual memory addresses associated with the copy of the requested page. In this example implementation, the buffer manager 122 uses the page manager 120 to determine the size of the free space in the copy of the requested page because the page manager 120 understands the format of pages whereas the buffer manager 122 does not. In this example implementation, the page manager 120 returns to the buffer manager 122 the size of the free space in the copy of the requested page.

Next, the buffer manager 122 determines whether it would be useful to reduce the free space in the copy of the requested page (818). In one example implementation, the buffer manager 122 determines whether it would be useful to reduce the free space in the copy of the requested page by comparing the amount of free space in the copy of the requested page to the minimum commit size of the computing system 100. For example, if the size of the free space in the copy of the requested page is greater than the minimum commit size of the computing system 100, it would be useful to reduce the free space in the copy of the requested page. In this example, the buffer manager 122 may compare the amount of free space in the copy of the requested page to the minimum commit size by comparing an available free space value in a header of the copy of the requested page to the minimum commit size. As discussed above, the available free space value indicates an amount of free space in the requested page. In this example, the buffer manager 122 may be able to compare the amount of free space in the copy of the requested page to the minimum commit size at order O(1) because the buffer manager uses the available free space value. In another example, the buffer manager 122 may be configured to determine that it would be useful to reduce the free space in the copy of the requested page when the size of the free space in the copy of the requested page is greater than two times the minimum commit size. If the buffer manager 122 determines that it would not be useful to reduce the free space in the copy of the requested page ("NO" of 820), the buffer manager 122 returns a reference indicating the first virtual memory address of the initial block of virtual memory addresses associated with the copy of the requested page to the page manager 120 in response to the page read request (808).

On the other hand, if the buffer manager 122 determines that it would be useful to reduce the free space in the copy of the requested page ("YES" of 820), the buffer manager 122 reorganizes the copy of the requested page (822). In one example implementation, the buffer manager 122 reorganizes the copy of the requested page by invoking a method of the page manager 120. In this example implementation, the buffer manager 122 uses the page manager 120 to reorganize the copy of the requested page because the page manager 120 understands the format of the copy of the requested page, whereas the buffer manager 122 does not. Reorganizing the copy of the requested page results in the header, all of the nodes or database entries in the copy of the requested page, the unavailable free space, and the tag array being associated with a first contiguous block of virtual memory addresses within the initial block of virtual memory addresses associated with the copy of the requested page. Furthermore, reorganization of the copy of the requested page results in the available free space being associated with a second contiguous block of virtual memory addresses within the initial block of virtual memory addresses associated with the copy of the requested page. FIGS. 2 and 3, described above, illustrate the result of reorganizing a copy of an interior page 200. Reorganization of the copy of the requested page also results in the updating of offset values in the tag array in the copy of the interior page to reflect the new positions of the nodes within the copy of requested page.

After the buffer manager 122 reorganizes the copy of the requested page, the buffer manager 122 deallocates the block(s) of physical data storage locations committed to the virtual memory addresses associated with the available free space of the copy of the requested page (824). For ease of explanation, this disclosure refers to the set of physical data storage locations committed to the virtual memory addresses associated with the available free space of the copy of the requested page as the available set of physical data storage locations. In one example implementation, the buffer manager 122 deallocates the available set of physical data storage locations by invoking a method of the operating system 124, indicating the virtual memory addresses associated with the available free space. Deallocating the available set of physical data storage locations allows the operating system 124 to use the physical data storage locations to store other data. In the example of FIG. 8, the buffer manager 122 does not unreserve the virtual memory addresses associated with the available free space of the copy of the requested page. Thus, the operating system 124 does not provide the virtual memory addresses associated with the available free space in response to a subsequent request to reserve virtual memory addresses in the virtual address space of the application 114. Once the buffer manager 122 has deallocated the available set of physical data storage locations, the buffer manager 122 returns a reference indicating a first virtual memory address in the initial block of virtual memory addresses associated with the copy of the requested page to the page manager 120 in response to the page read request (808).

Figure 9:
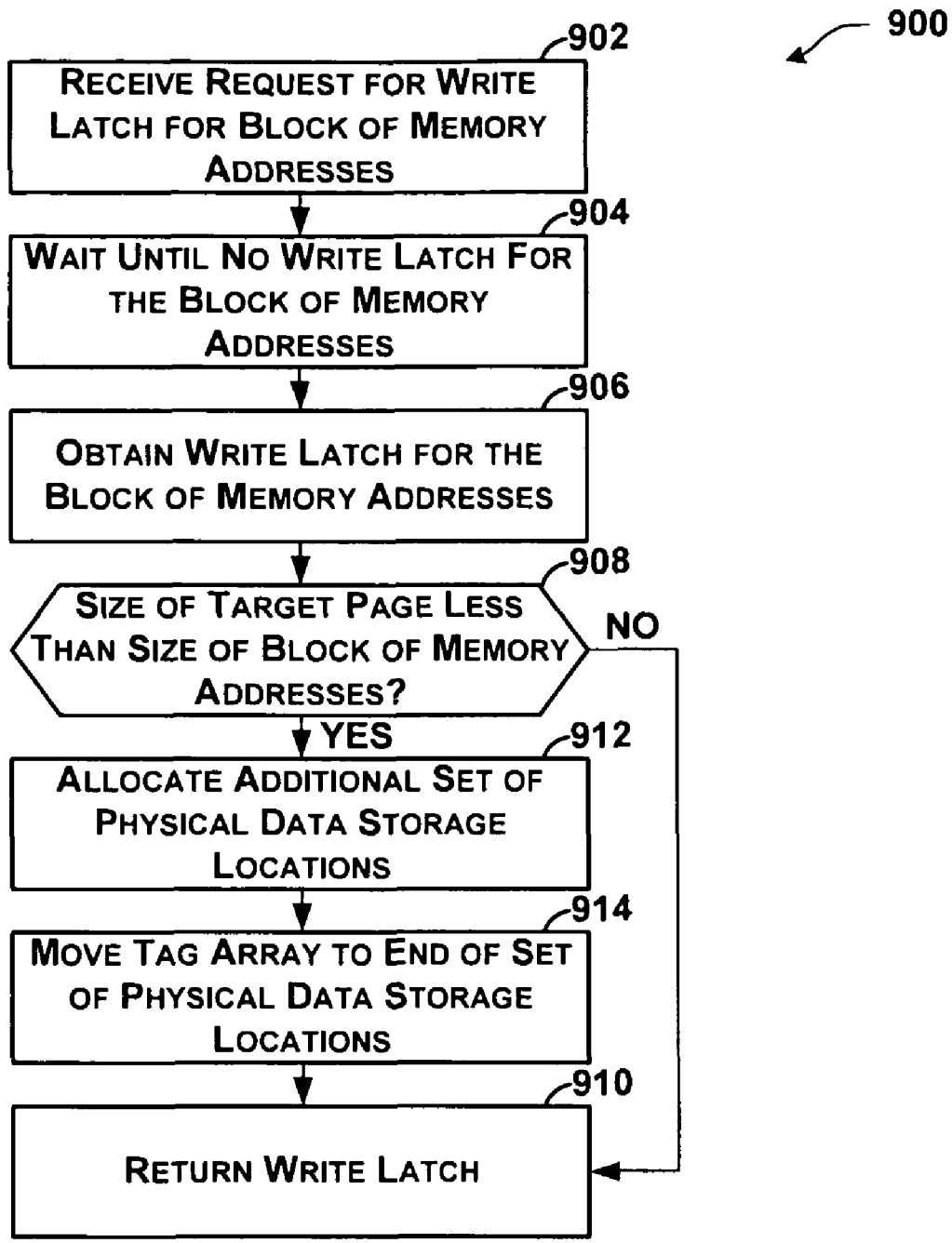
FIG. 9 is a flowchart illustrating an example operation of the buffer manager in response to a write request.

FIG. 9 is a flowchart illustrating an example operation 900 of the buffer manager 122 in response to a request for a write latch for a block of virtual memory addresses. It should be appreciated that FIG. 9 is provided for purposes of explanation only. FIG. 9 is not intended to represent a sole possible operation of the buffer manager 122 in response to a request for a write latch for a block of virtual memory addresses. For example, other operations of the buffer manager 122 may include more or fewer steps. In another example, other operations of the buffer manager 122 may include the steps of the operation 900 in a different order. Moreover, it is to be understood that other software or hardware components within the computing system 100 may perform the steps of the operation 900.

As illustrated in the example of FIG. 9, the operation 900 starts when the buffer manager 122 receives a request for a write latch for a block of virtual memory addresses associated with a copy of a target page in the database 110 (902). In one example implementation, the buffer manager 122 receives the request for the write latch when the page manager 120 invokes a method of a software interface provided by the buffer manager 122. The request for the write latch specifies the block of virtual memory addresses associated with the target page.

After the buffer manager 122 receives the request for the write latch, the buffer manager 122 waits until there is no write latch or read latch for the block of virtual memory addresses (904). When there is no write latch or read latch for the block of virtual memory addresses, the buffer manager 122 obtains the write latch for the block of virtual memory addresses (906).

The buffer manager 122 then determines whether the size of the target page is less than the size of the block of virtual memory addresses (908). Because copies of pages initially have the same size as the blocks of virtual memory addresses associated with the copies of the pages, the size of a copy of a page is only less than the size of the block of virtual memory addresses associated with the copy of the target page when the free space in the copy of the target page has been reduced. In one example implementation, the buffer manager 122 determines whether the size of the copy of the target page is less than a size of the block of virtual memory addresses by invoking a method of the page manager 120 that returns the size of the copy of the target page. In this example implementation, the buffer manager 122 then compares the size of the copy of the target page to the size of the block of virtual memory addresses. If the size of the copy of the target page is not less than the size of the block of virtual memory addresses ("NO" of 908), the buffer manager 122 returns the write latch to the page manager 120 as a response to the request for the write latch (910).

If the size of the copy of the target page is less than the size of the block of virtual memory addresses ("YES" of 908), the buffer manager 122 allocates an additional set of physical data storage locations to store data associated with the virtual memory addresses of the block of available free space of the target page (912). In one example implementation, the buffer manager 122 allocates the additional set of physical data storage locations by invoking a method provided by the operating system 124. The physical data storage locations in the additional set of physical data storage locations may or may not include same physical data storage locations that were originally committed to the addresses of the virtual memory addresses of the block of available free space.

After the buffer manager 122 allocates the additional set of physical data storage locations to store data associated with the virtual memory addresses of the available free space of the target page, the buffer manager 122 moves the tag array of the copy of the target page such that a last virtual memory address associated with the tag array is a last virtual memory address associated with the copy of the target page (914). In one example implementation, the buffer manager 122 moves the tag array to the last virtual memory address associated with the copy of the target page by invoking a method of the page manager 120. The buffer manager 122 then returns the write latch to the page manager 120 as a response to the request for the write latch (910).

Once the page manager 120 has obtained the write latch, the page manager 120 is free to write data to the copy of the target page. In one example implementation, after the page manager 120 has obtained the write latch, the page manager 120 invokes a method of the buffer manager 122 to write target data to the copy of the target page. When the buffer manager receives the request to write the target data, the buffer manager 122 writes the target data to the copy of the target page. After the page manager 120 is finished writing data to the copy of the target page, the page manager 120 releases the write latch on the buffer by invoking a method of the buffer manager 122.

Although the example of FIG. 9 describes an operation in which the buffer manager 122 expands the target page in response to a request for a write latch, it should be appreciated that the buffer manager 122 may expand a target page in other circumstances. For instance, the buffer manager 122 may expand the target page in response to receiving a notification that the page manager 120 intends to write new data to the target page. Furthermore, in the example of FIG. 9, the buffer manager 112 expands the target page to the size of the target page prior to reduction of free space in the target page. It should be appreciated that in some implementations, the buffer manager 112 may expand the target page to a size other than the previous size of the target page. For instance, the buffer manager 112 may expand the target page to a size just large enough to accommodate data to be stored in the target page.

Figure 10:
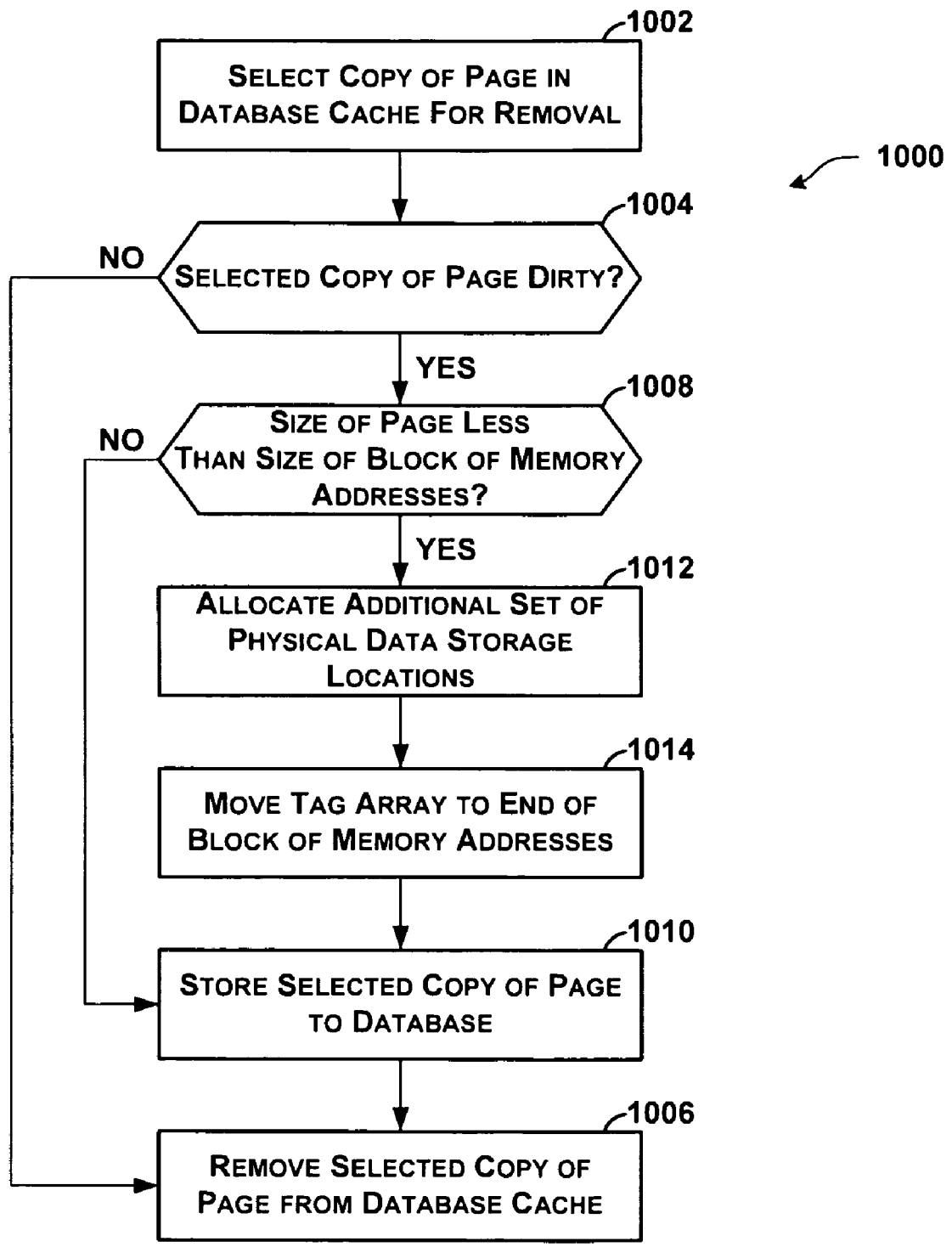
FIG. 10 is a flowchart illustrating an example operation of the buffer manager to flush copies of pages from a database cache.

FIG. 10 is a flowchart illustrating an example operation 1000 of the buffer manager 122 to flush copies of pages in the database cache 112. It should be appreciated that FIG. 10 is provided for purposes of explanation only. FIG. 10 is not intended to represent a sole possible operation of the buffer manager 122 to flush copies of pages in the database cache 112. For example, other operations of the buffer manager 122 may include more or fewer steps. In another example, other operations of the buffer manager 122 may include the steps of the operation 1000 in a different order. Moreover, it is to be understood that other software or hardware components within the computing system 100 may perform the steps of the operation 1000.

As illustrated in the example of FIG. 10, the operation 1000 starts when the buffer manager 122 selects a copy of a page in the database cache 112 for removal (1002). The buffer manager 122 may select a copy of a page in the database cache 112 in response to a variety of conditions. For example, the buffer manager 122 may select a copy of a page in the database cache 112 when the database cache 112 is full and the buffer manager 122 has received a request to read an additional page into the database cache 112. In another example, the buffer manager 122 may periodically scan through the database cache 112 and select a copy of a page.

The buffer manager 122 may use a variety of algorithms to select the copy of the page. For example, the buffer manager 122 may select least-recently used copies of pages in the database cache 122. In another example, the buffer manager 122 may use a weighting scheme that favors copies of pages that have had their free space reduced. In other words, the buffer manager 122 is more likely to select full size copies of pages than copies of pages that have had their free space reduced.

After selecting the copy of the page in the database cache 112, the buffer manager 122 determines whether the selected copy of the page is dirty (1004). As discussed above, a copy of a page is dirty if the copy of the page contains data different than the page. In one example implementation, each of the copies of pages in the database cache 112 is associated with a clean/dirty flag. In this example implementation, the buffer manager 122 sets the clean/dirty flag associated with a copy of a page to dirty when the buffer manager 122 writes to data the copy of the page in the database cache 112. In this example implementation, the buffer manager 122 uses the clean/dirty flag associated with the selected copy of the page to determine whether the selected copy of the page is dirty.

If the selected copy of the page is not dirty ("NO" of 1004), the buffer manager 122 removes the selected copy of the page from the database cache 112 (1006). When the buffer manager 122 removes the selected copy of the page from the database cache 112, the buffer manager 122 deallocates the set of physical data storage locations committed to the block of virtual memory addresses associated with the selected copy of the page. In addition, when the buffer manager 122 removes the selected copy of the page from the database cache 112, the buffer manager 112 frees the block of virtual memory addresses associated with the selected copy of the page. In different implementations, the buffer manager 112 may free the block of virtual memory addresses in different ways. For instance, in a first example implementation, the buffer manager 112 unreserves the block of virtual memory addresses, thereby indicating to the operation system 124 that the buffer manager 112 will no longer use the block of virtual memory addresses. In a second example implementation, the buffer manager 112 frees the block of virtual memory addresses by adding the block of virtual memory addresses to a pool of unused virtual memory addresses. Each virtual memory address in the pool of unused virtual memory addresses remains reserved for use by the buffer manager 112.

On the other hand, if the selected copy of the page is dirty ("YES" of 1004), the buffer manager 122 determines whether the size of the selected copy of the page is less than the size of the block of virtual memory addresses associated with the selected copy of the page (1008). Because copies of pages are initially the same size of the block of virtual memory addresses associated with the copies of the pages, the size of a copy of a page is only less than the size of the block of virtual memory addresses associated with the page when the free space in the copy of the page has been reduced. In one example implementation, the buffer manager 122 determines whether the size of the selected copy of the page is less than a size of the block of virtual memory addresses associated with the selected copy of the page by invoking a method of the page manager 120 that returns the size of the page. In this example implementation, the buffer manager 122 then compares the size of the selected copy of the page to the size of the block of virtual memory addresses associated with the selected copy of the page. If the size of the selected copy of the page is not less than the size of the block of virtual memory addresses associated with the selected copy of the page ("NO" of 1008), the buffer manager 122 stores the selected copy of the interior page to the database 110 (1010). After storing the selected copy of the interior page to the database 110, the buffer manager 122 removes the selected copy of the page from the database cache 112 (1006).

If the size of the selected copy of the page is less than the size of the block of virtual memory addresses associated with the selected copy of the page ("YES" of 1008), the buffer manager 122 allocates an additional set of physical data storage locations committed to the virtual memory addresses associated with the available free space of the selected copy of the page (1012). In one example implementation, the buffer manager 122 allocates the additional set of physical data storage locations by invoking a method of the operating system 124. Next, the buffer manager 122 moves the tag array of the selected copy of the page to an end of the virtual memory addresses associated with the selected copy of the page (1014). The buffer manager 122 then stores the selected copy of the page to the database 110 (1010). After storing the selected copy of the page to the database 110, the buffer manager 122 removes the selected copy of the page from the database cache 112 (1006).

It should be appreciated that the operation 1000 is merely one example operation of the buffer manager 122 to flush copy of pages to the database 110. For example, in another example operation, the buffer manager 122 may not perform steps 1012-1014.

Figure 11:
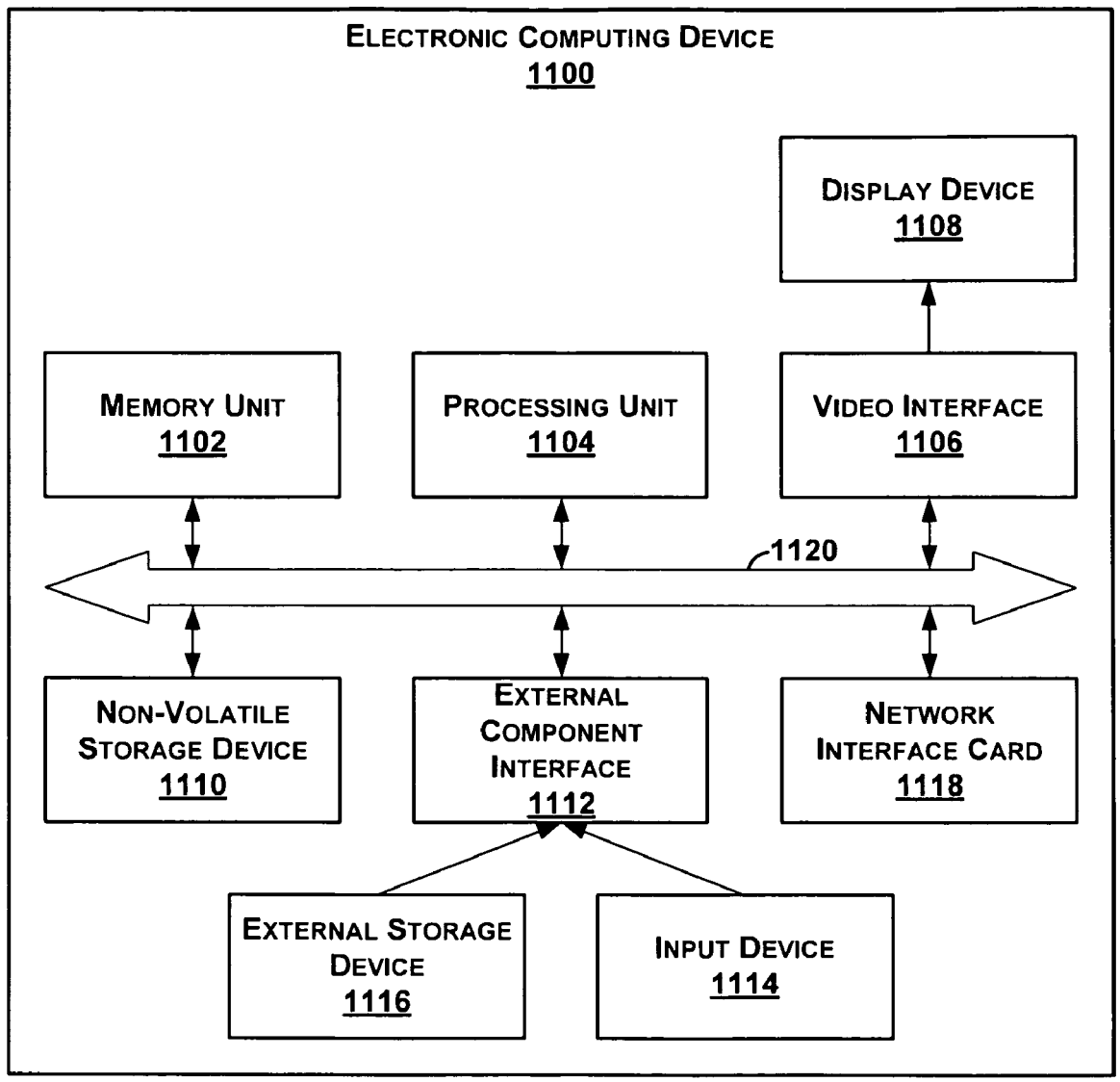
FIG. 11 is a block diagram showing example physical components of an electronic computing device.

FIG. 11 is a block diagram illustrating example physical components of an electronic computing device 1100. As illustrated in the example of FIG. 11, the electronic computing device 1100 comprises a memory unit 1102. The memory unit 1102 is a computer-readable data storage medium capable of storing data and/or software instructions. The memory unit 1102 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, the electronic computing device 1100 comprises a processing unit 1104. As mentioned above, a processing unit is a set of one or more physical electronic integrated circuits that are capable of executing software instructions. In a first example, the processing unit 1104 may execute software instructions that cause the electronic computing device 1100 to provide specific functionality. In this first example, the processing unit 1104 may be implemented as one or more processing cores and/or as one or more separate microprocessors. For instance, in this first example, the processing unit 1104 may be implemented as one or more Intel Core 2 microprocessors. The processing unit 1104 may be capable of executing software instructions in an instruction set, such as the x86 instruction set, the POWER instruction set, a RISC instruction set, the SPARC instruction set, the IA-64 instruction set, the MIPS instruction set, or another instruction set. In a second example, the processing unit 1104 may be implemented as an ASIC that provides specific functionality. In a third example, the processing unit 1104 may provide specific functionality by using an ASIC and by executing software instructions.

The electronic computing device 1100 also comprises a video interface 1106. The video interface 1106 enables the electronic computing device 1100 to output video information to a display device 1108. The display device 1108 may be a variety of different types of display devices. For instance, the display device 1108 may be a cathode-ray tube display, an LCD display panel, a plasma screen display panel, a touch-sensitive display panel, a LED array, or another type of display device.

In addition, the electronic computing device 1100 includes a non-volatile storage device 1110. The non-volatile storage device 1110 is a computer-readable data storage medium that is capable of storing data and/or software instructions. The non-volatile storage device 1110 may be a variety of different types of non-volatile storage devices. For example, the non-volatile storage device 1110 may be one or more hard disk drives, magnetic tape drives, CD-ROM drives, DVD-ROM drives, Blu-Ray disc drives, solid state drives, solid state memory, or other types of non-volatile storage devices.

The electronic computing device 1100 also includes an external component interface 1112 that enables the electronic computing device 1100 to communicate with external components. As illustrated in the example of FIG. 11, the external component interface 1112 enables the electronic computing device 1100 to communicate with an input device 1114 and an external storage device 1116. In one implementation of the electronic computing device 1100, the external component interface 1112 is a Universal Serial Bus (USB) interface. In other implementations of the electronic computing device 1100, the electronic computing device 1100 may include another type of interface that enables the electronic computing device 1100 to communicate with input devices and/or output devices. For instance, the electronic computing device 1100 may include a PS/2 interface. The input device 1114 may be a variety of different types of devices including, but not limited to, keyboards, mice, trackballs, stylus input devices, touch pads, touch-sensitive display screens, or other types of input devices. The external storage device 1116 may be a variety of different types of computer-readable data storage media including magnetic tape, flash memory modules, magnetic disk drives, optical disc drives, and other computer-readable data storage media.

In addition, the electronic computing device 1100 includes a network interface card 1118 that enables the electronic computing device 1100 to send data to and receive data from an electronic communication network. The network interface card 1118 may be a variety of different types of network interface. For example, the network interface card 1118 may be an Ethernet interface, a token-ring network interface, a fiber optic network interface, a wireless network interface (e.g., WiFi, WiMax, etc.), or another type of network interface.

The electronic computing device 1100 also includes a communications medium 1120. The communications medium 1120 facilitates communication among the various components of the electronic computing device 1100. The communications medium 1120 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The electronic computing device 1100 includes several computer-readable data storage media (i.e., the memory unit 1102, the non-volatile storage device 1110, and the external storage device 1116). Together, these computer-readable storage media may constitute a single data storage system (e.g., the data storage system 102). As discussed above, a data storage system is a set of one or more computer-readable data storage mediums. This data storage system may store software instructions executable by the processing unit 1104.

Activities described in the above description may result from the execution of the software instructions stored on this data storage system. Thus, when this description says that a particular logical module performs a particular activity, such a statement may be interpreted to mean that software instructions of the logical module, when executed by the processing unit 1104, cause the electronic computing device 1100 to perform the activity. In other words, when this description says that a particular logical module performs a particular activity, a reader may interpret such a statement to mean that the software instructions configure the electronic computing device 1100 such that the electronic computing device 1100 performs the particular activity.

The techniques of this disclosure may be realized in a wide variety of ways. For example, the techniques of this disclosure may be realized as a method of managing a database cache. The method comprises storing a database in one or more persistent computer-readable data storage media. The database comprises a set of pages. Each page in the set of pages has a fixed size. Each of the pages contains substantive data. The method also comprises receiving, at a computing system, a page read request for a requested page in the set of pages. In addition, the method comprises reserving, by the computing system, an initial block of virtual memory addresses having the fixed size. Furthermore, the method comprises allocating, by the computing system, a set of physical data storage locations committed to the initial block of virtual memory addresses. In addition, the method comprises reading, by the computing system, the requested page from the persistent computer-readable data storage media. The method also comprises storing, by the computing system, a copy of the requested page into the set of physical data storage locations. A minimum commit size is a minimum number of bytes that an operating system of the computing system is configured to allocate. The copy of the requested page comprises the substantive data of the requested page and available free space. The size of the available free space is equal to the fixed size minus a smallest multiple of the minimum commit size that is greater than a size of the substantive data. The substantive data is associated with a first set of virtual memory addresses within the initial block of virtual memory addresses. The available free space is associated with a second set of virtual memory addresses within the initial block of virtual memory addresses. Furthermore, the method comprises after storing the copy of the requested page, deallocating, by the computing system, an available set of physical data storage locations committed to the second set of virtual memory addresses. The method also comprises returning, by the computing system, a reference to the copy of the requested page as a response to the page read request.

In another example, the techniques of this disclosure may be realized as a computing system comprising a processing unit comprising at least one integrated circuit. The computing system further comprising a data storage system comprising at least one computer-readable data storage medium. The data storage system storing a database in one or more persistent computer-readable data storage media in the data storage system, the database comprising a set of pages, each page in the set of pages having a fixed size, each of the pages containing substantive data. The data storage system also stores a buffer manager comprising software instructions that, when executed by the processing unit, cause the computing system to receive a page read request for a requested page. The instructions also cause the computing system to in response to receiving the page read request reserve an initial block of virtual memory addresses having the fixed size. In addition, the instructions cause the computing system to allocate a set of physical data storage locations committed to the initial block of virtual memory addresses. Furthermore, the instructions cause the computing system to read the requested page from the persistent computer-readable data storage media. The instructions also cause the computing system to store a copy of the requested page into the set of physical data storage locations. In addition, the instructions cause the computing system to determine, after storing the copy of the requested page into the set of physical data storage locations, whether a size of available free space in the copy of the requested page is greater than a minimum commit size, the size of the available free space being equal to the fixed size minus a smallest multiple of the minimum commit size that is greater than a size of the substantive data, the minimum commit size being a minimum number of bytes that an operating system of the computing system is configured to allocate. In addition, the instructions cause the computing system to reorganize, when the size of the available free space is greater than the minimum commit size, the copy of the requested page such that the substantive data in the copy of the requested page is associated with a first contiguous block of virtual memory addresses within the initial block of virtual memory addresses and the available free space is associated with a second contiguous block of virtual memory addresses within the initial block of virtual memory addresses. The instructions also cause the computing system to deallocate, after reorganizing the copy of the requested page, an available set of physical data storage locations committed to the second contiguous block of virtual memory addresses. In addition, the instructions cause the computing system to return, after deallocating the available set of physical data storage locations, a reference to the copy of the requested page as a response to the page read request.

In another example, the techniques of this disclosure may be realized as a computer readable data storage medium storing instructions that, when executed by a processing unit of a computing system, cause the computing system to store a database in one or more persistent computer-readable data storage media. The database comprises a set of pages. Each page in the set of pages has a fixed size of 32 kilobytes. The set of pages comprises a set of data pages and an interior page. Each of the pages contains substantive data comprising a plurality of nodes, free space, and metadata. Each of the nodes in the interior page containing a key value and a reference to a page in the set of pages containing a database entry having a field that specifies the key value. Each of the nodes in each of the data pages containing a database entry, each of the database entries being e-mail messages. The free space consists of a block of available free space and a block of unavailable free space. The computer readable data storage medium also stores an application comprising instructions that, when executed by the processing unit, cause the computing system to generate a query specifying criteria to process a web content request received by the computing system. In addition, the computer readable storage medium also stores a database manager comprising instructions that, when executed by the processing unit, cause the computing system to process the criteria to identify a requested value of a particular field of the one or more database entries in the database. The instructions of the database manager also cause the computing system to generate a database entry read request specifying the requested value. The computer-readable data storage medium also stores a tree manager comprising instructions that, when executed by the processing unit, cause the computing system to receive the database entry read request from the database manager. The instructions of the tree manager also cause the computing system to generate, in response to the database entry read request, a second read request. The second read request indicates a requested page in the set of pages. The computer-readable data storage medium also comprises a page manager comprising instructions that, when executed by the processing unit, cause the computing system to receive the second read request. The instructions of the page manager also cause the computing system to generate, in response to the second read request, a third read request. The third read request indicating the requested page. In addition, the computer-readable data storage medium stores a buffer manager comprising instructions that, when executed by the processing unit, cause the computing system to perform the following in response to receive the third read request. The instructions of the buffer manager also cause the computing system to in response to receiving the third read request reserve an initial block of virtual memory addresses having the fixed size. The instructions of the buffer manager also cause the computing system to allocate a set of physical data storage locations committed to the initial block of virtual memory addresses. In addition, the instructions of the buffer manager cause the computing system to read the requested page from the persistent computer-readable data storage media. Furthermore, the instructions of the buffer manager also cause the computing system to store a copy of the requested page into the set of physical data storage locations. The instructions of the buffer manager also cause the computing system to determine, after storing the copy of the requested page into the set of physical data storage locations, whether a size of the block of available free space in the copy of the requested page is greater than a minimum commit size, the size of the block of available free space being equal to the size of the requested page minus a smallest multiple of the minimum commit size that is greater than a size of the substantive data, the minimum commit size being a minimum number of bytes that an operating system of the computing system is configured to allocate. In addition, he instructions of the buffer manager cause the computing system to reorganize, when the size of the free space is greater than the minimum commit size, the copy of the requested page such that the substantive data is associated with a first contiguous block of virtual memory addresses within the initial block of virtual memory addresses and the block of available free space is associated with a second contiguous block of virtual memory addresses within the initial block of virtual memory addresses. Furthermore, the instructions of the buffer manager cause the computing system to deallocate, after reorganizing the copy of the requested page, an available set of physical data storage locations committed to the second contiguous block of virtual memory addresses. The instructions of the buffer manager also cause the computing system to return, after deallocating the available set of physical data storage locations, a reference to the copy of the requested page as a response to the third read request. The instructions of the page manager, when executed by the processing unit, further cause the computing system to receive, in response to the third read request, the reference to the copy of the requested page. The instructions of the page manager also cause the computing system to return the reference to the copy of the requested page as a response to the second read request. The instructions of the tree manager, when executed by the processing unit, further cause the computing system to receive, in response to the second read request, the reference to the copy of the requested page. The instructions of the tree manager also cause the computing system to determine, after receiving the reference to the copy of the interior page, whether the requested page is the interior page. The instructions of the tree manager also cause the computing system to identify, when the requested page is the interior page, a target node in the requested page. The target node is one of the nodes in the requested page having a highest-order key value less than the requested value. The instructions of the tree manager further cause the computing system to generate a fourth read request. The fourth read request indicating a target page indicated by the target node. In addition, the instructions of the tree manager cause the computing system to receive a reference to a copy of the target page. The instructions of the tree manager also cause the computing system to identify the requested database entry in the target page and return a reference to the requested database entry in response to the database entry read request. The instructions of the database manager, when executed by the processing unit, further cause the computing system to provide the reference to the requested database entry as a response to the query. The instructions of the application, when executed by the processing unit, further cause the computing system to use the requested database entry to process the web content request.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of managing a database cache, the method comprising:
   storing a database in one or more persistent computer-readable data storage media, the database comprising a set of pages, each page in the set of pages having a fixed size, each of the pages containing substantive data;
   receiving, at a computing system, a page read request for a requested page in the set of pages;
   reserving, by the computing system, an initial block of virtual memory addresses having the fixed size;
   allocating, by the computing system, a set of physical data storage locations committed to the initial block of virtual memory addresses;
   reading, by the computing system, the requested page from the persistent computer-readable data storage media;
   storing, by the computing system, a copy of the requested page into the set of physical data storage locations, a minimum commit size being a minimum number of bytes that an operating system of the computing system is configured to allocate, the copy of the requested page comprising the substantive data of the requested page and available free space, the size of the available free space being equal to the fixed size minus a smallest multiple of the minimum commit size that is greater than a size of the substantive data, the substantive data being associated with a first set of virtual memory addresses within the initial block of virtual memory addresses, the available free space being associated with a second set of virtual memory addresses within the initial block of virtual memory addresses;
   after storing the copy of the requested page, deallocating, by the computing system, an available set of physical data storage locations committed to the second set of virtual memory addresses; and
   returning, by the computing system, a reference to the copy of the requested page as a response to the page read request.

2. The method of claim 1, wherein the substantive data comprises a plurality of nodes and metadata, the metadata comprises a tag array, the tag array comprising offset values, the offset values indicating virtual memory addresses of the nodes relative to an initial virtual memory address of the copy of the requested page.

3. The method of claim 2,
wherein the metadata comprises a header; and
wherein the method further comprises: prior to deallocating the available set of physical data storage locations:
moving, by the computing system, the nodes within the copy of the requested page such that free space adjacent to one or more of the nodes is reduced; and
updating, by the computing system, the offset values such that the offset values indicate virtual memory addresses of the nodes relative to the initial virtual memory address of the copy of the requested page.

4. The method of claim 3,
wherein the header stores an available free space value indicating the size of the available free space; and
wherein the method further comprises determining, at the computing system, comparing the available free space value to the minimum commit size; and
wherein deallocating the available set of physical data storage locations comprises deallocating, by the computing system, the available set of physical data storage locations when the computing system determines that the available free space value is greater than the minimum commit size.

5. The method of claim 1 further comprising:
receiving, at the computing system, a database entry read request for a requested database entry in the database; and
in response to the database entry read request for the requested database entry, generating, by the computing system, the page read request.

6. The method of claim 5, wherein the substantive data of the requested page comprises a plurality of nodes, each of the nodes of the requested page containing a key value and a reference to a page in the set of pages.

7. The method of claim 6, further comprising:
after returning the reference to the copy of the requested page, identifying, by the computing system, a target node in the copy of the requested page, the target node being one of the nodes in the copy of the requested page containing a key value associated with a requested value;
generating, at the computing system, a target page read request for a target page, the target page indicated by the target node; and
receiving, at the computing system, a reference to a copy of the target page as a response to the target page read request.

8. The method of claim 7 further comprising:
determining, by the computing system, whether the target page is an interior page or a data page; and
in response to determining that the target page is a data page:
identifying, by the computing system, the requested database entry in the target page; and
returning, by the computing system, a reference to the requested database entry as a response to the database entry read request.

9. The method of claim 7, wherein the requested database entry is an e-mail message.

10. The method of claim 1, further comprising:
in response to receiving the page read request:
determining whether the database cache stores the copy of the requested page; and
returning the reference to the copy of the requested page in response to determining that the database cache stores the copy of the requested page.

11. The method of claim 10, further comprising:
automatically selecting, by the computing system, a copy of a selected page of the database in the database cache; and
automatically removing, by the computing system, the copy of the selected page from the database cache.

12. The method of claim 1 further comprising after deallocating the available set of physical data storage locations:
receiving, at the computing system, a request to write target data to the copy of the requested page;
allocating, by the computing system, an additional set of physical data storage locations to the second set of virtual memory addresses; and
after allocating the additional set of physical data storage locations, writing, by the computing system, the target data to the copy of the requested page.

13. The method of claim 12,
wherein the substantive data comprises a plurality of nodes and a tag array, the tag array comprising offset values, the offset values indicating virtual memory addresses of the nodes relative to an initial virtual memory address of the copy of the requested page; and
wherein the method further comprises after allocating the additional set of physical data storage locations to the second contiguous block of virtual memory addresses, moving, by the computing system, the tag array in the copy of the requested page such that a last virtual memory address associated with the tag array is a last virtual memory address associated with the copy of the requested page.

14. The method of claim 13 further comprising:
before allocating the additional set of physical data storage locations to the second set of virtual memory addresses, receiving, at the computing system, a request for a write latch on the initial block of virtual memory addresses;
after receiving the request for the write latch, obtaining, by the computing system, the write latch; and
after writing the target data to the copy of the requested page, releasing, by the computing system, the write latch.

15. The method of claim 1, wherein the computing system comprises an electronic computing device, the electronic computing device comprising a processing unit that executes instructions stored in a data storage system, execution of the instructions causing the electronic computing device to perform the actions of claim 1, the data storage system comprising at least one computer-readable data storage medium.

16. A computing system comprising:
a processing unit comprising at least one integrated circuit; and
a data storage system comprising at least one computer-readable data storage medium, the data storage system storing:
a database in one or more persistent computer-readable data storage media in the data storage system, the database comprising a set of pages, each page in the set of pages having a fixed size, each of the pages containing substantive data;
a buffer manager comprising software instructions that, when executed by the processing unit, cause the computing system to:
receive a page read request for a requested page in the set of pages;

reserve an initial block of virtual memory addresses having the fixed size;

allocate a set of physical data storage locations committed to the initial block of virtual memory addresses;

read the requested page from the persistent computer-readable data storage media;

store a copy of the requested page into the set of physical data storage locations;

determine, after storing the copy of the requested page into the set of physical data storage locations, whether a size of available free space in the copy of the requested page is greater than a minimum commit size, the size of the available free space being equal to the fixed size minus a smallest multiple of the minimum commit size that is greater than a size of the substantive data, the minimum commit size being a minimum number of bytes that an operating system of the computing system is configured to allocate;

reorganize, when the size of the available free space is greater than the minimum commit size, the copy of the requested page such that the substantive data in the copy of the requested page is associated with a first contiguous block of virtual memory addresses within the initial block of virtual memory addresses and the available free space is associated with a second contiguous block of virtual memory addresses within the initial block of virtual memory addresses;

deallocate, after reorganizing the copy of the requested page, an available set of physical data storage locations committed to the second contiguous block of virtual memory addresses; and return, after deallocating the available set of physical data storage locations, a reference to the copy of the requested page as a response to the page read request.

17. The computing system of claim 16,
wherein the substantive data in the copy of the requested page comprises a plurality of nodes, a header and a tag array, the header storing an available free space value indicating the size of the available free space, the tag array comprising offset values, the offset values indicating virtual memory addresses of the nodes relative to an initial virtual memory address of the copy of the requested page;
wherein the instructions that cause the computing system to reorganize the copy of the requested page cause the computing system to:
  move the nodes within the copy of the requested page such that free space adjacent to one or more of the nodes is reduced; and
  update the offset values of the tag array such that the offset values indicate virtual memory addresses of the nodes relative to the initial virtual memory address of the copy of the requested page; and
wherein the instructions that cause the computing system to determine whether the size of the available free space is greater than the minimum commit size comprises using the available free space value to determine the size of the free space.

18. The computing system of claim 16,
wherein the substantive data in the copy of the requested page comprises a plurality of nodes, each of the nodes in the requested page containing a key value and a reference to a page in the set of pages; and wherein the data storage system further comprises:
a tree manager comprising instructions that, when executed by the processing unit, cause the computing system to:
  receive a database entry read request for a requested database entry in the database;
  generate, in response to the database entry read request for the requested database entry, the page read request;
  identify, after the buffer manager causes the computing system to return the reference to the copy of the requested page, a target node in the copy of the requested page, the target node being one of the nodes in the copy of the requested page specifying a key value associated with a requested value;
  generate a target page read request for a target page, the target page indicated by the target node;
  receive a reference to a copy of the target page as a response to the target page read request;
  determine whether the target page is an interior page or a data page; and
  in response to determining that the target page is a data page:
    identify the requested database entry in the target page; and
    return a reference to the requested database entry in response to the database entry read request.

19. The computing system of claim 16, wherein after deallocating the available set of physical data storage locations, the instructions of the buffer manager further cause the computing system to:
  receive a request for a write latch on the block of virtual memory addresses associated with the copy of the requested page;
  obtain the write latch in response to receiving the request for the write latch;
  allocate, after obtaining the write latch, an additional set of physical data storage locations committed to the second contiguous block of virtual memory addresses;
  receive, after allocating the additional set of physical data storage locations committed to the second contiguous block of virtual memory addresses, a request to write target data to the copy of the requested page;
  write, in response to receiving the request to write the target data to the copy of the requested page, the target data to the copy of the requested page; and
  release the write latch after writing the target data to the copy of the requested page.

20. A computer-readable physical data storage medium storing:
instructions that, when executed by a processing unit of a computing system, cause the computing system to store a database in one or more persistent computer-readable data storage media, the database comprising a set of pages, each page in the set of pages having a fixed size of 32 kilobytes, the set of pages comprising a set of data pages and an interior page, each of the pages containing substantive data comprising a plurality of nodes, free space, and metadata, each of the nodes in the interior page containing a key value and a reference to a page in the set of pages containing a database entry having a field that specifies the key value, each of the nodes in each of the data pages containing a database entry, each of the database entries being e-mail messages, the free space consisting of a block of available free space and a block of unavailable free space;

an application comprising instructions that, when executed by the processing unit, cause the computing system to generate a query specifying criteria to process a web content request received by the computing system;

a database manager comprising instructions that, when executed by the processing unit, cause the computing system to:
process the criteria to identify a requested value of a particular field of the one or more database entries in the database; and
generate a database entry read request specifying the requested value;

a tree manager comprising instructions that, when executed by the processing unit, cause the computing system to:
receive the database entry read request from the database manager; and
generate, in response to the database entry read request, a second read request, the second read request indicating a requested page in the set of pages;

a page manager comprising instructions that, when executed by the processing unit, cause the computing system to:
receive the second read request; and
generate, in response to the second read request, a third read request, the third read request indicating the requested page;

a buffer manager comprising instructions that, when executed by the processing unit, cause the computing system to perform the following in response to receiving the third read request:
reserve an initial block of virtual memory addresses having the fixed size;
allocate a set of physical data storage locations committed to the initial block of virtual memory addresses;
read the requested page from the persistent computer-readable data storage media;
store a copy of the requested page into the set of physical data storage locations;
determine, after storing the copy of the requested page into the set of physical data storage locations, whether a size of the block of available free space in the copy of the requested page is greater than a minimum commit size, the size of the block of available free space being equal to the size of the requested page minus a smallest multiple of the minimum commit size that is greater than a size of the substantive data, the minimum commit size being a minimum number of bytes that an operating system of the computing system is configured to allocate;
reorganize, when the size of the free space is greater than the minimum commit size, the copy of the requested page such that the substantive data is associated with a first contiguous block of virtual memory addresses within the initial block of virtual memory addresses and the block of available free space is associated with a second contiguous block of virtual memory addresses within the initial block of virtual memory addresses;
deallocate, after reorganizing the copy of the requested page, an available set of physical data storage locations committed to the second contiguous block of virtual memory addresses; and
return, after deallocating the available set of physical data storage locations, a reference to the copy of the requested page as a response to the third read request;

wherein the instructions of the page manager, when executed by the processing unit, further cause the computing system to:
receive, in response to the third read request, the reference to the copy of the requested page; and
return the reference to the copy of the requested page as a response to the second read request;

wherein the instructions of the tree manager, when executed by the processing unit, further cause the computing system to:
receive, in response to the second read request, the reference to the copy of the requested page;
determine, after receiving the reference to the copy of the interior page, whether the requested page is the interior page;
identify, when the requested page is the interior page, a target node in the requested page, the target node being one of the nodes in the requested page having a highest-order key value less than the requested value;
generate a fourth read request, the fourth read request indicating a target page indicated by the target node;
receive a reference to a copy of the target page;
identify the requested database entry in the target page; and
return a reference to the requested database entry in response to the database entry read request;

wherein the instructions of the database manager, when executed by the processing unit, further cause the computing system to provide the reference to the requested database entry as a response to the query; and wherein the instructions of the application, when executed by the processing unit, further cause the computing system to use the requested database entry to process the web content request.

* * * * *